(12) United States Patent
Benes et al.

(10) Patent No.: US 8,006,926 B2
(45) Date of Patent: Aug. 30, 2011

(54) KNIFE BANK ASSEMBLY OF A COUNTER KNIFE ASSEMBLY OF AN INTEGRAL CHOPPER ASSEMBLY OF A COMBINE HARVESTER

(75) Inventors: Jason M. Benes, Mount Joy, PA (US); Andrew V. Lauwers, Stevens, PA (US); Nathan E. Isaac, Lancaster, PA (US); Herbert M. Farley, Elizabethtown, PA (US); Bradley J. Wagner, Orrtanna, PA (US); Jonathan E. Ricketts, Ephrata, PA (US); Kevin W. Ward, Lititz, PA (US)

(73) Assignee: CNH America LLC, New Holland, PA (US)

( * ) Notice: Subject to any disclaimer, the term of this patent is extended or adjusted under 35 U.S.C. 154(b) by 419 days.

(21) Appl. No.: 12/154,587

(22) Filed: May 23, 2008

(65) Prior Publication Data
US 2008/0290198 A1 Nov. 27, 2008

Related U.S. Application Data

(60) Provisional application No. 60/931,418, filed on May 23, 2007.

(51) Int. Cl.
*B02C 18/14* (2006.01)
(52) U.S. Cl. ....... 241/88.4; 241/89.3; 241/243; 241/286
(58) Field of Classification Search .................. 241/88.4, 241/89.3, 242, 243, 286
See application file for complete search history.

(56) References Cited

U.S. PATENT DOCUMENTS

| | | | |
|---|---|---|---|
| 105,344 A | 7/1870 | Lee | |
| 239,349 A | 3/1881 | Sherck | |
| 290,647 A | 12/1883 | Messinger | |
| 2,670,775 A | 3/1954 | Elofson | |
| 2,708,582 A | 5/1955 | Adams | |
| 2,865,416 A | 12/1958 | Hetteen | |
| 3,005,637 A | 10/1961 | Hetteen | |
| 3,103,241 A | 9/1963 | Weigel | |
| 3,815,823 A | 6/1974 | Johnson | |
| 4,342,319 A | 8/1982 | Willis et al. | |
| 4,484,587 A | 11/1984 | Raineri | |
| 4,836,457 A * | 6/1989 | Greiner | 241/73 |
| 5,368,238 A | 11/1994 | Bergkamp et al. | |

(Continued)

FOREIGN PATENT DOCUMENTS
DE 19633290 2/1998
(Continued)

*Primary Examiner* — Faye Francis
(74) *Attorney, Agent, or Firm* — Michael G. Harms; Patrick M. Sheldrake

(57) ABSTRACT

A knife bank assembly of a counter knife assembly of an integral chopper assembly of a combine harvester that includes an elongated bracket member that extends between opposed knife bank end plates and has a plurality of spaced retainment mounts securable therealong, with at least one, and preferably two, knife blades being removably connectable to each retainment mount in a side by side arrangement. The knife elements are removably connectable to the retainment mounts at first and second space mounting points, preferably in such a way that the knife elements are maintained in an extended position by application of a biasing force at the second mounting point but are rotatable about the first mounting point to a displaced or relaxed position if a sufficient force is applied to the leading edge of the knife element to overcome the biasing force.

7 Claims, 22 Drawing Sheets

U.S. PATENT DOCUMENTS

| | | | |
|---|---|---|---|
| 5,503,339 A | 4/1996 | Doppstadt | |
| 5,542,883 A | 8/1996 | Cruson | |
| 5,928,079 A | 7/1999 | Roberg | |
| 5,928,080 A | 7/1999 | Jakobi | |
| 5,974,776 A | 11/1999 | Prellwitz | |
| 6,120,373 A | 9/2000 | Schrattenecker | |
| 6,370,851 B1 | 4/2002 | Uros et al. | |
| 6,594,983 B1 | 7/2003 | Krone et al. | |
| 6,595,123 B2 | 7/2003 | Schrag et al. | |
| 6,699,121 B2 | 3/2004 | Bognar et al. | |
| 6,769,239 B1 | 8/2004 | Webb | |
| 6,912,835 B1 | 7/2005 | Chabassier | |
| 6,976,913 B2 | 12/2005 | Duquesne et al. | |
| 7,252,587 B2 | 8/2007 | Viaud | |
| 7,281,974 B2 | 10/2007 | Anderson et al. | |

FOREIGN PATENT DOCUMENTS

| | | |
|---|---|---|
| DE | 19646316 | 5/1998 |
| EP | 806134 | 11/1997 |
| EP | 1027821 | 8/2000 |

* cited by examiner

KNIFE BANK ASSEMBLY OF A COUNTER KNIFE ASSEMBLY OF AN INTEGRAL CHOPPER ASSEMBLY OF A COMBINE HARVESTER

This application claims the benefit of U.S. Provisional Application No. 60/931,418, filed May 23, 2007.

TECHNICAL FIELD

This invention relates generally to agricultural harvesting combines and machines and to straw and residue chopping systems therewith, especially integral chopper assemblies that have a rotary chopper element or portion and an associated counter knife assembly positioned generally parallel thereto, and more particularly to a knife bank assembly of the counter knife assembly and components thereof, especially retainment mounts for the knife elements that permit the knife elements of the knife bank assembly to be both individually replaceable within the knife bank assembly and also displaceable under extreme loading to prevent damage thereto, and a mounting of the knife bank assembly to permit adjustability of the knife bank relative to the grate portion of the chopper grate assembly so as to make certain alignment tasks easier.

BACKGROUND ART

In the operation of a typical agricultural combine that employs a threshing rotor, the flow of crop residue, sometimes referred to as material other than grain (MOG), remaining after threshing is typically discharged into a crop residue treatment and distribution system for treatment thereby and for ultimate distribution onto or over a field. Straw and residue chopper assemblies and residue spreader assemblies of various types and constructions have long been in use in or with such residue treatment and distribution systems. Such assemblies have operated to chop or pulverize the crop residue resulting from a harvesting operation into finer pieces and/or to spread the resulting crop residue, whether chopped into finer pieces by operation of a chopper assembly or passed to the spreader assembly as larger pieces of residue, onto and over the field. While such chopper and residue spreader assemblies have taken various forms, depending upon the desires of users and manufacturers, they may sometimes be identified as being of certain general types.

Many typical harvesters have traditionally employed technology and methods that have become associated with what is sometimes referred to as a hood mount chopper. Generally, such hood mount choppers can be described as flail choppers, and the systems of which they are a part have evolved to the point that they may include over 100 flail knives on a rotating chopper, mounted within a dedicated housing that provides an appropriate environment for the operation of the rotating chopper so as to best maximize its performance. The rotating chopper of such a residue management system may often operate at or above 3000 RPM and provide suitable and sufficient energy to the chopped material to be able to effect a spread of the chopped material over a width of up to 40 feet, which width generally corresponds to the cut width of the header. Such a residue management system is thus operable for its intended purpose of chopping and spreading the chopped material over a field, and generally operates effectively in such regard. With such a system, if a user does not desire to chop the straw, he may turn the chopper off and bypass, or route the material flow around, the chopper.

Typical Case IH harvesters, however, have, for over 25 years now, in an effort to provide greater equipment versatility while reducing equipment complexities, typically employed a somewhat different technology in the residue management systems thereof. Such alternative technology, the primary purpose of which has been the transport of material away from the threshing system, has utilized a multifaceted construction that affords greater versatility in the transport of such material in that such material can not only be transported, but can also be treated in varying manners dependent upon the desires of operators. Such constructions have come to be known as integral choppers or integral chopper or chopping systems due to the integration of a chopping function, in addition to the primary transport function, into the combine and its operations. Such integral chopper systems, because of their positioning within the combine and their functional capabilities, offer a versatility not generally available with the hood mounted chopper systems.

Such integral chopper systems have been so designed that, as noted hereinabove, their primary function is the transport of material away from the threshing system and a secondary function is the treatment of such material as it is being so transported. Such operations are usually effected in one of two different ways. Most commonly, the integral chopper system is operated to transport the material from the threshing system to a spreading system as a rotary chopper element or portion rotates at or near 3000 RPM so as to quickly move the material rearwardly and to also chop it into smaller pieces as it is being so transported. Less commonly, the integral chopper system is operated to more gently transport the material from the threshing system to a spreading system as the rotary chopper element operates at a much slower speed, typically at only about 800 RPM, with considerably less chopping activity. In the former instance, the desire and expectation is that the material will be transported and that the shortest mean length of cut will be realized to allow for modern minimum tillage applications while the chopping is accomplished using as little power as possible. In the latter instance, the desire and expectation is that the material will be transported in such a manner as to provide the longest and least damaged straw possible.

With reference to such integral chopper systems, the more recent integral chopper systems have typically included a residue chopper assembly that has a rotary chopper component or element disposed laterally within a housing extending generally horizontally across the flow path of the crop residue through the housing, as well as a counter knife assembly extending generally parallel to and spaced from the rotary chopper element. The counter knife assembly has included a chopper grate assembly spaced below and extending generally parallel to the rotary chopper element and a knife mounting assembly positioned generally beneath the chopper grate assembly.

The rotary chopper element of the residue chopper assembly has typically included a cylindrical tube or like member having a plurality of mounting locations distributed about its periphery, at which locations various knife blades or paddles have been mounted or affixed. Oftentimes the mounting locations and the knife blades connected or mounted thereat have been disposed in rows and columns, though sometimes in differing array configurations, about the outer surface of the rotary member so that, as the rotary member has been operated, the knife blades have served to contact and pull and push rearwardly the residue material passing near the rotary member, sometimes also cutting such residue material into smaller pieces as the residue material has been propelled rearwardly.

The chopper grate assemblies of the counter knife assemblies of such integral chopper assemblies have typically included a grate portion, often welded in place as part of the chopper grate assembly, having a plurality of holes or transverse slots spaced along its length, which holes or transverse slots have typically been so sized that smaller pieces of crop residue, which may include un-separated grain, have been able to pass therethrough and enter the combine cleaning system, at least when such holes or slots have not had other elements positioned therein or extending therethrough or have not otherwise been obstructed.

The knife mounting assemblies of such counter knife assemblies have typically included bar-like elements or components, positioned generally below the chopper grate assembly, extending in a fixed end-to-end arrangement with a plurality of spaced blade elements, often welded in place along the portion of the bar-like element generally facing the rotary chopper element, which blade elements have been aligned with slots in the grate portion of the chopper grate assembly. Such blade elements and slots in the grate portion of the chopper grate assembly have been coordinately sized and configured to permit the blade elements to be insertable into the slots to at least partially project therethrough when the knife mounting assembly is disposed in certain positions.

Often, the counter knife assemblies have had associated therewith an adjustment mechanism that has been operable to vary the spacing between the grate portion of the chopper grate assembly and the knife mounting assembly, as well as the degree of projection of the blade elements of the knife mounting assembly through the slots of the grate portion, as may have been desirable depending upon the crop being harvested. Such an adjustment mechanism has operated to move the knife mounting assembly between a fully engaged position with the blade elements of the knife mounting assembly extending through the slots towards the rotary chopper element and a fully retracted position in which the blade elements are fully withdrawn or retracted from the slots, and has typically also been operable to adjustably vary the position between a fully engaged and fully retracted position.

A counter knife assembly of such general construction, whether or not the knife mounting assembly thereof has had the capability of being adjustably repositionable relative to the grate portion by an adjustment mechanism, has often been referred to as a stationary knife assembly. Such nomenclature has been considered appropriate since such knife mounting assemblies, though perhaps adjustable to some extent to vary the distance between the rotary chopper element and the knife mounting assembly, such as by movement of the knife mounting assembly relative to the grate portion of the chopper grate assembly and the slots thereof, often in an arc-like movement about an offset axis parallel to both the rotary chopper element and the longitudinal axis of the knife assembly mounting, remain in essentially fixed or stationary positions during the chopping operation of the residue chopper assembly once they have been adjustably moved to a given position.

With such constructions, the knife blades or paddles of the rotary chopper element have cooperated with the blade elements of the knife mounting assembly when the knife mounting assembly has been positioned such that the blade elements thereof projected through the slots in the grate portion of the chopper grate assembly to both propel the residue rearwardly and to better chop the residue as it passed between the rotary chopper element and the chopper grate assembly.

Thus, in the operation of a typical combine that employs an integral chopper system, the flow of crop residue after threshing is typically discharged into a crop residue treatment and distribution system located below and rearwardly of the rear end of the threshing system, which crop residue treatment and distribution system includes the integral chopper system and its primary rotary chopper or beater apparatus or assembly that is operable to chop or beat the residue into smaller pieces as it transports and/or propels the resultant crop residue further rearwardly within a rear end of the combine for either discharge from the combine through a rear opening onto a field, or into another secondary chopper and/or spreader mounted on the rear end operable for spreading the residue over a swath of a field.

During a typical operation of such a combine, as the crop residue is discharged from the combine rotor and moves through the crop residue treatment and distribution system, it flows between the rotary chopper element of the integral chopper assembly and the chopper grate assembly thereof. When the stationary knife assembly is in an engaged position, as the crop residue is being moved and propelled rearwardly, such crop residue is also chopped into smaller pieces by the cooperative actions of the knife blades or elements of the stationary knife assembly and the knife blades or paddles on the rotating rotary chopper element. The rotational movement of the rotary chopper element, typically at or near 3000 RPM, thus serves not only to propel the resultant flow of crop residue further rearwardly, but also to effect a cutting of the material encountered by the knife blades or paddles associated therewith.

When the stationary knife assembly is positioned to a fully retracted position, however, such as might be desirable with some crops and/or for some residue, the crop residue passing between the rotary chopper element and the chopper grate assembly is moved rearwardly by the action of the rotary chopper element, but with greatly lessened chopping activity. If the rotary chopper element is rotated at a substantially lower speed, such as about 800 RPM, longer pieces of residue, with considerably less damage thereto, can be effectively transported rearwardly.

In general, it has been found that such dual and alternative transport operations of the integral chopper systems can best be realized by employing knife elements fixedly or rigidly mounted to or on the rotary member, as opposed to flail-type elements that could be mounted to lugs on the rotary member so as to be free to rotate about such lug connections, and by the use of blade elements that have a sharpened edge to efficiently and effectively cut or chop the residue, as opposed to blunt bars for beating or pulverizing such residue, as the residue passes between the rotary chopper element and the chopper grate assembly.

Such integral chopper systems, which are based upon a legacy design utilized by Case IH harvesters for approximately 25 years, have recognized advantages over hood mounted chopper systems in that they often allow combines to be manufactured with simpler designs and fewer moving parts, resulting in less expensive base units and lighter weight products, while typically performing at levels competitive to performance standards of hood mounted choppers. Despite the recognized versatility and advantages of the integral chopper systems, users have continued to seek improved systems and have continued to present their desires and critiques of the prior art systems.

In such regard, users have continued to state their desires for an integral chopper system that can better absorb impacts with foreign objects without significant damage or breakage. In light thereof, and to address various European marketing demands, attempts have been made in more recent years to develop new types of integral chopper systems, including integral chopper systems that could utilize flail-type elements and connectors instead of fixed and rigidly mounted knife blades on the rotary element. In general, such integral chopper systems have met with limited success, due in part to difficulties in dealing with the increase in material throughput that has been experienced over the past 10 years as machine capacities, and consequent demands upon the integral position, have increased.

More particularly, at least with respect to flail-type integral chopper systems, it has proven difficult to achieve a system that can, to the desired degrees, effectively offer and provide the dual capabilities of, in one alternative, chopping into or reducing the residue to finer pieces for spreading as such residue is transported rearwardly and, in the other alternative, more gently transporting the residue, in larger pieces, rearwardly for windrowing. The use of flail-type elements and mountings in lieu of fixed and rigidly mounted knife blades on the rotary element has generally not resulted in the degree of success and satisfaction desired therefor, especially when such an integral chopper system has been operated as an 800 RPM flail chopper. In such operation, the flail-type elements, due to the lack of inertia associated therewith, have sometimes, even in the absence of heavy loading, folded back along their direction of travel and caused plugging of the harvester and consequent reliability problems. Such factor has been seen as a significant limitation to, and disadvantage of, a flail-type integral chopper as opposed to a fixed blade integral chopper.

On the other hand, such flail-type integral choppers offered one significant advantage over fixed blade integral choppers in that they could, unlike fixed blade integral choppers, better absorb energy when foreign objects, such as auger fingers or rocks, were encountered within the crop residue flow during operations. Often, with a fixed blade integral chopper, an impact with such a foreign object, especially if relatively severe, would effect mission disabling damage to a fixed blade integral chopper system, such as by cracking or breaking either or both the rotating knife blades or the stationary counter knife elements, or even snapping off the knife blade or element or breaking off its mounting, resulting in missing knife blade components and denigrating the performance of the assembly. With the flail-type integral choppers, however, the rotating flail-type elements could fold back if and when a foreign object became captured by the stationary knife elements, thereby significantly minimizing the possibility of damage to or breakage of the stationary knife elements or the rotating flail-type elements.

Consequently, attempts to develop improved integral chopper systems have continued. The ongoing challenge has been to develop an integral chopper assembly that can offer the various advantages desired while overcoming or minimizing the disadvantages that have been encountered with the prior art systems. The integral chopper system, as discussed and described hereinafter, is a newly developed system that employs various inventive concepts to realize in great part the various advantages sought therefor while overcoming and/or minimizing many of the difficulties and disadvantages associated with the prior art constructions.

SUMMARY OF THE INVENTION

What has now been developed and is disclosed herein is an improved integral chopper assembly that incorporates into its design various features and components that contribute to an overall improvement in and versatility of operation. Among such components is an improved knife bank assembly that includes an elongated bracket member that extends between opposed knife bank end plates and has a plurality of spaced retainment mounts secured therealong with at least one, and preferably two, knife blades being connectable to each retainment mount in a side-by-side arrangement. Spaced mounting eyelets are provided along one side of the bracket member, through which mounting eyelets a shaft member is installed to extend between journalled mountings at the concave pan side plates. By sliding the bracket member mounted on the shaft member from side to side below the grate portion, adjustments can be quickly and easily made relative to the positioning of the knife elements connected to the retainment mounts with the slots through the grate portion. The opposed knife bank end plates may have knife bank adjustment mechanisms attached thereto in conventional manners to control the degree of rotation of the bracket member, and so the retainment mounts thereof and the connected knife elements about the shaft member that extends through the spaced mounting eyelets, to control the amount by which the knife elements are allowed to project through the slots in the grate portion.

In several preferred embodiments, the bracket member is a trough bracket and the retainment mounts are formed to be generally pistol-shaped, with a grip portion thereof attachable in any suitable manner to an interior side or surface of the trough bracket and a generally flat-side barrel portion extending outwardly from its juncture with the grip portion. One preferred retainment mount embodiment includes a central body portion between spaced side walls while another preferred retainment mount embodiment includes, in place of the central body portion, only a central web portion between the side walls of such retainment mount.

Along the barrel portion of such retainment mount embodiments are disposed a mounting hole positioned closer to the grip portion and a mounting slot positioned closer to the distal end of the barrel portion, both of which are generally transverse to the spaced side walls of the retainment mount. Nut and bolt pairs are utilized to mount the knife elements to the retainment mounts, with a first nut and bolt pair associated with the mounting hole of the barrel portion and a registered hole in the base portion of the knife elements connected to the retainment mount and a second nut and bolt pair associated with the mounting slot of the barrel portion and another registered hole in the base portion of the knife elements connected to the retainment mount.

With such connection of the knife elements to the retainment mount, when the leading side of a knife element is subjected to a loading sufficient to overcome the clamping force of the second nut and bolt pair with the barrel portion of the retainment mount, the mounted knife element will rotate backwardly and downwardly about the first nut and bolt pair through the mounting hole of the barrel portion, with the second nut and bolt pair moving through the mounting slot as the knife element rotates to a displaced position.

The knife elements may be so dimensioned that the width of the barrel portion is approximately the distance between slots in the grate portion, and the retainment slots may be so positioned along and secured to the trough bracket to provide like spacing between the knife elements on adjacent retainment mounts.

Preferably, the retainment mounts may be individually removably mountable to the trough bracket, such as by nut and bolt pairings that secure the grip portions of such retainment mounts to the trough bracket, so that the retainment mounts can be individually removed and replaced and/or knife elements connected thereto can be more easily accessed in the event of damage thereto. The use of individually removably mountable retainment mounts also allows the knife bank assembly to be more easily built up, without inherent difficulties that can arise when retainment mounts are permanent components of the knife bank assembly.

Other embodiments of retainment mounts and mounted knife elements may utilize other constructions for effecting displacement of the individual knife elements in the event of extreme loading, including shear bolts, biasing elements and constructions of various types, and other systems that are operable to similar effect.

Such features, by themselves and in conjunction with various other improvements and features of the integral chopper assembly, including improvements in and features of the rotary chopper element, more specifically in the layout and arrangement of knife blade helixes along and about the rotary member thereof, as well as the inclusion and use of an interruption plate and a replaceable grate associated with the chopper grate assembly and the employment of optional blade covers for converting the knife blades of the rotary member to function as beater elements instead of chopping elements, to mention but of few of such improvements and features, contribute to the improved performance realizable with the preferred integral chopper assembly that is further described and discussed in greater detail hereinafter.

DETAILED DESCRIPTION OF THE INVENTION

Figure 1:
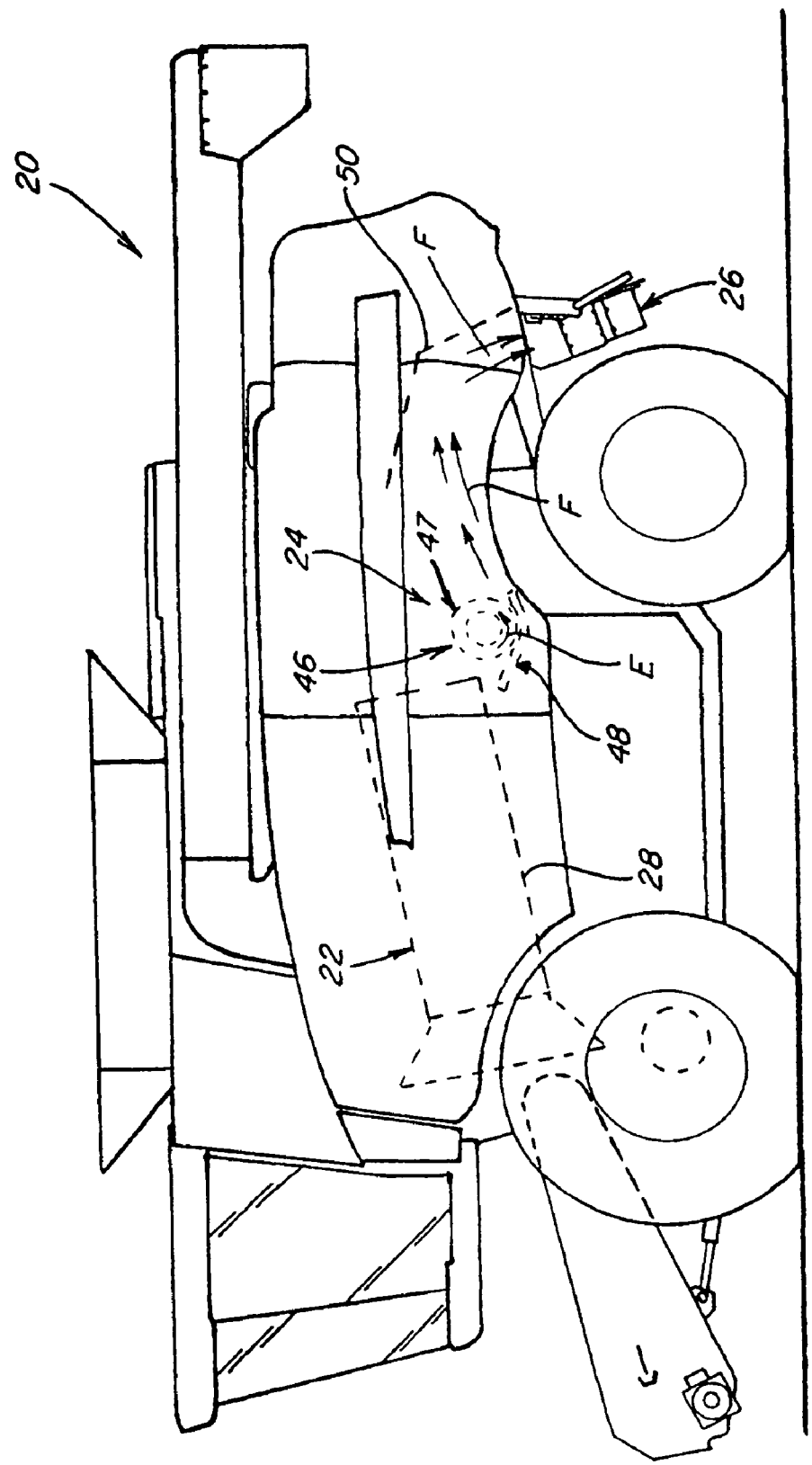
FIG. 1 is a simplified side plan view, from the left side, of an agricultural combine, illustrating, in dotted outline, an axially arranged threshing system of the combine and an improved integral chopper assembly of the residue treatment and distribution system of the combine that includes the present invention.
Figure 2:
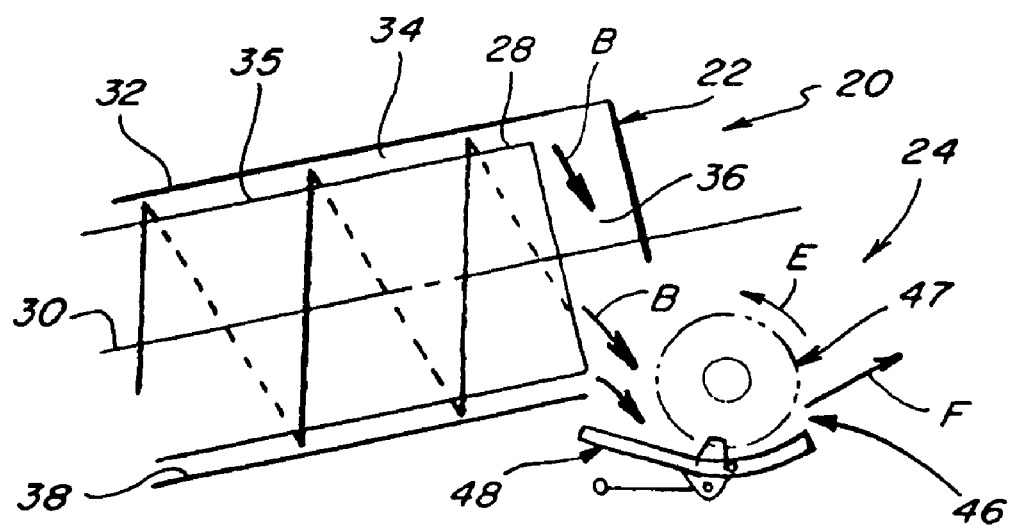
FIG. 2 is a simplified side plan view, from the left side, of the threshing system and a portion of the crop residue treatment and distribution system of the combine of FIG. 1, further illustrating the flow of crop residue to and through the integral chopper assembly.

Referring now to the drawings, wherein preferred embodiments of an improved integral chopper assembly that includes the present invention are shown, wherein like numerals refer to like items, wherein certain elements and features may be labeled or marked on a representative basis without each like element or feature necessarily being individually shown, labeled, or marked, and wherein certain elements are labeled and marked in only some, but not all, of the drawing figures, FIGS. 1 and 2 depict a representative agricultural combine 20 that includes a longitudinally axially arranged threshing system 22 and a crop residue treatment and distribution system 24 with a crop residue spreader 26, all of which, except for the improved integral chopper system that is the subject hereof and which is included within the crop residue and distribution system 24, are of well known construction and operation.

As can be generally and essentially observed from a review and study of FIGS. 1-2, threshing system 22 is axially arranged in that it includes a cylindrical threshing rotor 28 conventionally supported and rotatable in a predetermined, typically clockwise direction, about a rotational axis 30 therethrough and within a concave 32 (FIG. 2), for conveying a flow of crop material in a helical flow path through a space 34 extending circumferentially around an outer cylindrical surface 35 of rotor 28 and an inner circumferential surface 38 of concave 32. As the crop material is moved through space 34, the crop, such as grain, legumes, or the like, will be loosened and separated from crop residue such as husk and pods, and carried away therefrom in the well known conventional manner.

As may be best illustrated by FIG. 2, the crop residue will continue along a helical path through space 34, and will be expelled therefrom, as denoted by arrows B, into and through a discharge opening and passage 36, which essentially comprises an extension of space 34 at the downstream end of threshing rotor 28. The consistency of the flow of crop residue, volume thereof, and extent or pattern thereof, will typically vary, and be a function of a variety of conditions, including, but not limited to, the speed of rotation of rotor 28, crop type, plant maturity, moisture content, and weather conditions. As an example, rotor speeds can vary between just a few hundred RPM and over 1000 RPM. Wheat and other small grains will typically have relatively small crop residue components, whereas other grains, such as corn, will typically have larger components, such as thick stalk segments, cob fragments, and large leaves.

Crop residue treatment and distribution system 24 will typically include a transport and chopping assembly, such as integral chopper assembly 46, sometimes hereinafter referred to as rotary assembly 46 having a rotary chopper element 47 rotatable in a direction E above a concave pan assembly such as chopper grate assembly 48. Rotary chopper element 47 typically rotates at a rapid speed, so as to be capable of accelerating and propelling a flow of crop residue rearwardly within the confines of the rear end of combine 20, as generally denoted by arrows F. Such rearward flow is typically guided and directed by internal panels or shields, generally denoted by shields 50 (FIG. 1), so as to either flow through a rear opening so as to be deposited directly onto a field, such as in a windrow, or flow into a secondary crop residue chopper and/or spreader, such as chopper/spreader 26, for spreading thereby in a swath on the field.

In the further consideration of the drawings of this application and the discussion of such drawings and the elements shown therein, it should also be understood and appreciated that, for purposes of clarity in various of such drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like-manner and for a like purpose as the representative element depicted.

Figure 3:
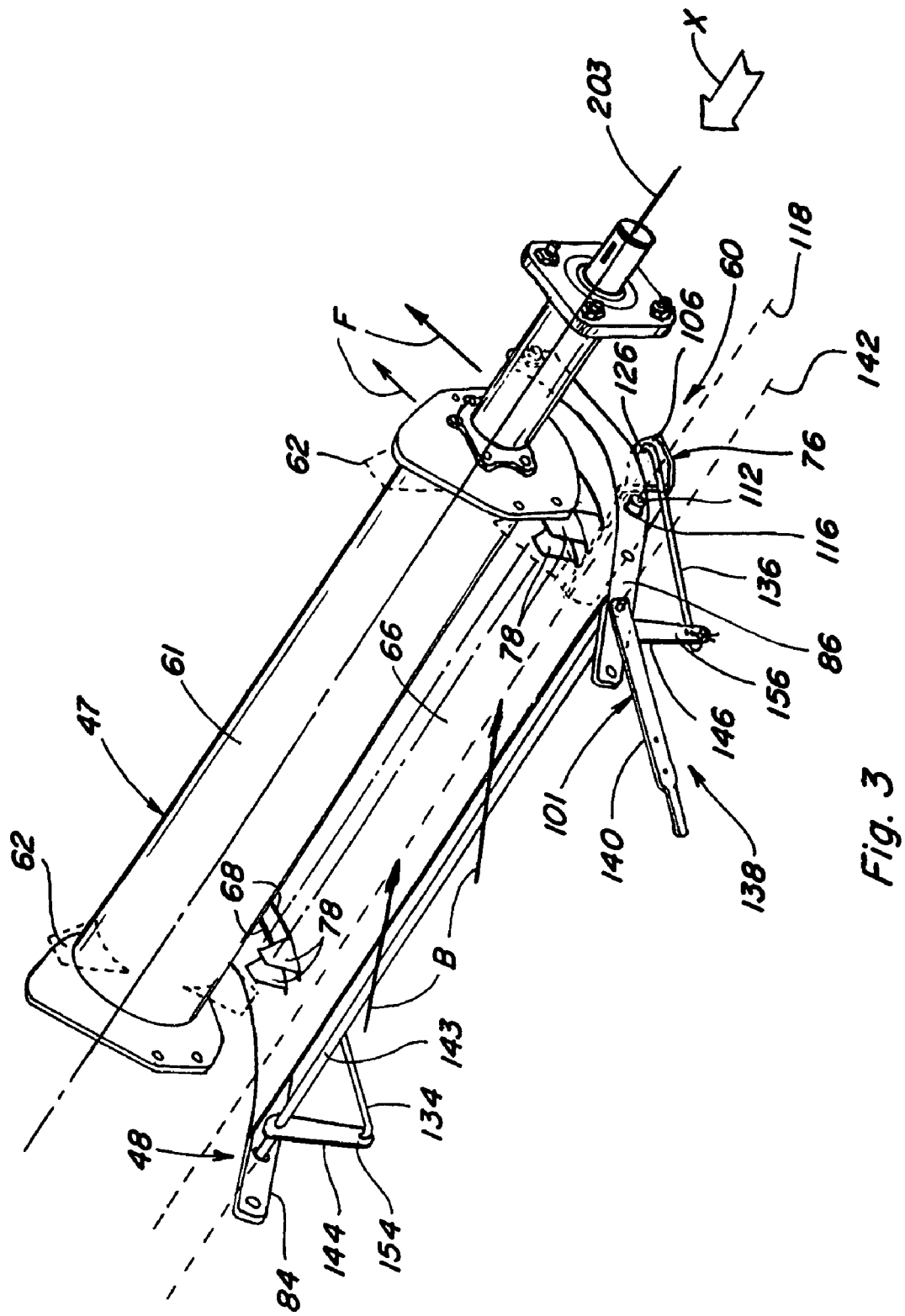
FIG. 3 is a perspective view, from the left front side of a chopper assembly, generally depicting one preferred embodiment of a counter knife assembly of the integral chopper assembly of FIGS. 1 and 2, wherein, for purposes of clarity, knife blades on the rotary chopper element of the integral chopper assembly are shown in dotted outline only and phantom lines along the central portions of the rotary chopper element and the grate assembly should be considered to include therealong various components, representative components of which are depicted to the outer sides thereof.
Figure 4:
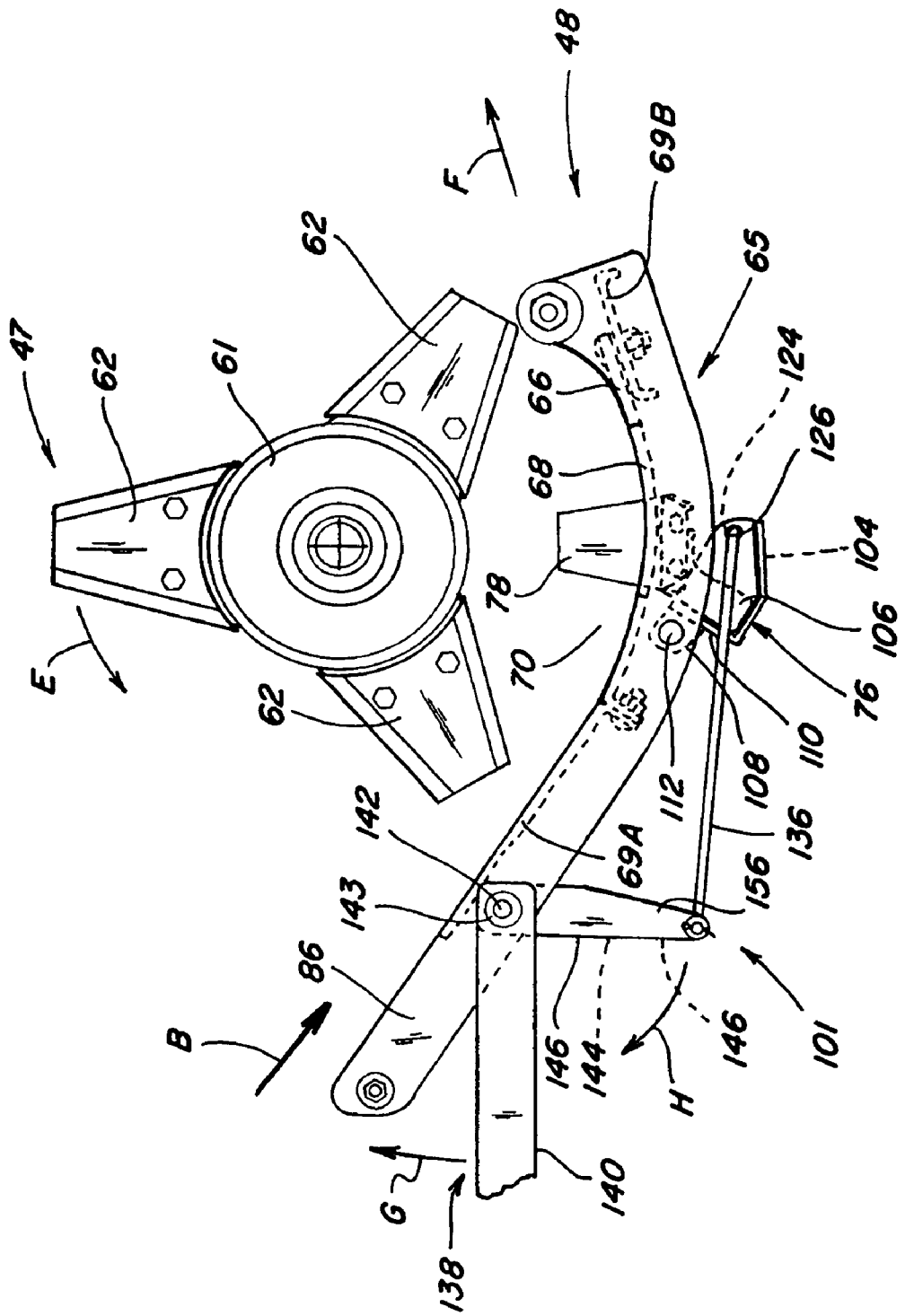
FIG. 4 is a simplified left side plan view, generally viewed from position X in FIG. 3, of a portion of the integral chopper assembly of FIG. 3, including the counter knife assembly thereof.

In light of the foregoing, FIGS. 3-4 thus depict generally a portion of an integral chopper assembly 46 that includes a rotary chopper portion or element 47 that extends generally horizontally across the flow path of the crop residue above a chopper grate assembly 48 that includes as a portion thereof the counter knife assembly 60. Such rotary chopper element 47 includes a cylindrical element or like rotary member 61, and has a number of paddles or knife blades 62, only representative ring sets of which are individually depicted in FIGS. 3 and 4, mounted or affixed thereto at a plurality of mounting locations distributed about its periphery. The particular positionings, arrangements, and configurations of such plurality of paddles or knife blades 62 will be addressed further hereinafter.

Figure 5:
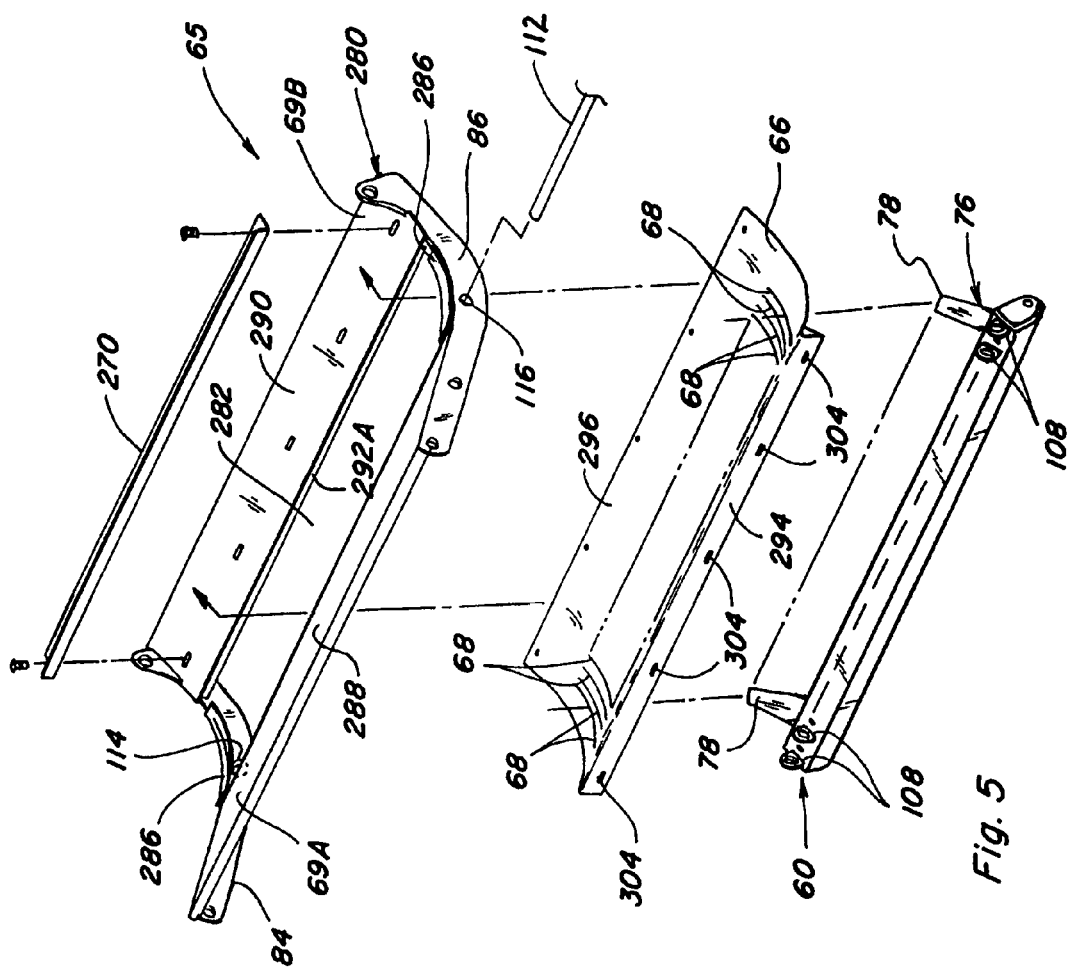
FIG. 5 is an exploded perspective view of various portions of the concave pan portion of the integral chopper assembly of FIGS. 3 and 4.

FIG. 5 depicts in an exploded view various components of the chopper grate assembly 48 of the integral chopper assembly 46, including a generally concave pan portion 65, sometimes hereinafter also referred to as a concave pan assembly. Such concave pan portion 65 includes a grate portion 66 that extends generally parallel to the rotary chopper element 47 (as better shown in FIG. 3) with a plurality of spaced slots 68 therealong, the purpose and configurations of which slots 68 will be further addressed hereinafter, disposed between leading and trailing plate portions 69A and 69B. For purposes of clarity, not all of the slots in the grate portion 66, including especially a plurality of slots along and/or within the phantom lines in the central portion of the grate portion 66, are depicted in FIGS. 3 and 5.

As will be appreciated by those skilled in the art, the grate portion 66 and the leading and trailing portions 69A and 69B of the chopper gate assembly 48 have often in the past been welded together as part of the larger component concave pan portion 65. In the particular embodiment depicted in FIG. 5, however, such components 66, 69A, and 69B are shown as separate elements that, for purposes that will be further discussed hereinafter, may be matably joined together with one another and other components to form the concave pan portion 65, as will be further explained in that which follows.

As may now be better observed from FIG. 4, rotary chopper element 47 and grate portion 66 of concave pan portion 65 of chopper grate assembly 48 define a passageway 70 therebetween for the crop residue flow that is directed to the integral chopper assembly 46 for treatment thereby, such as crop residue flow B from the threshing system 22 (FIG. 2). The slots 68 in grate portion 66 are generally elongated and extend along such grate portion 66 generally in the direction of the crop residue flow B.

With reference, now, to all of FIGS. 3-5, counter knife assembly 60 includes a stationary knife bank 76 positioned generally beneath and parallel to both rotary chopper element 47 and grate portion 66, having a plurality of spaced knife elements 78 therealong. Such knife elements 78 are mounted at positions along knife bank 76 generally alignable with slots 68 in grate portion 66 that are coordinately sized and configured to permit the knife elements 78 to be movable to project through slots 68.

Figure 6:
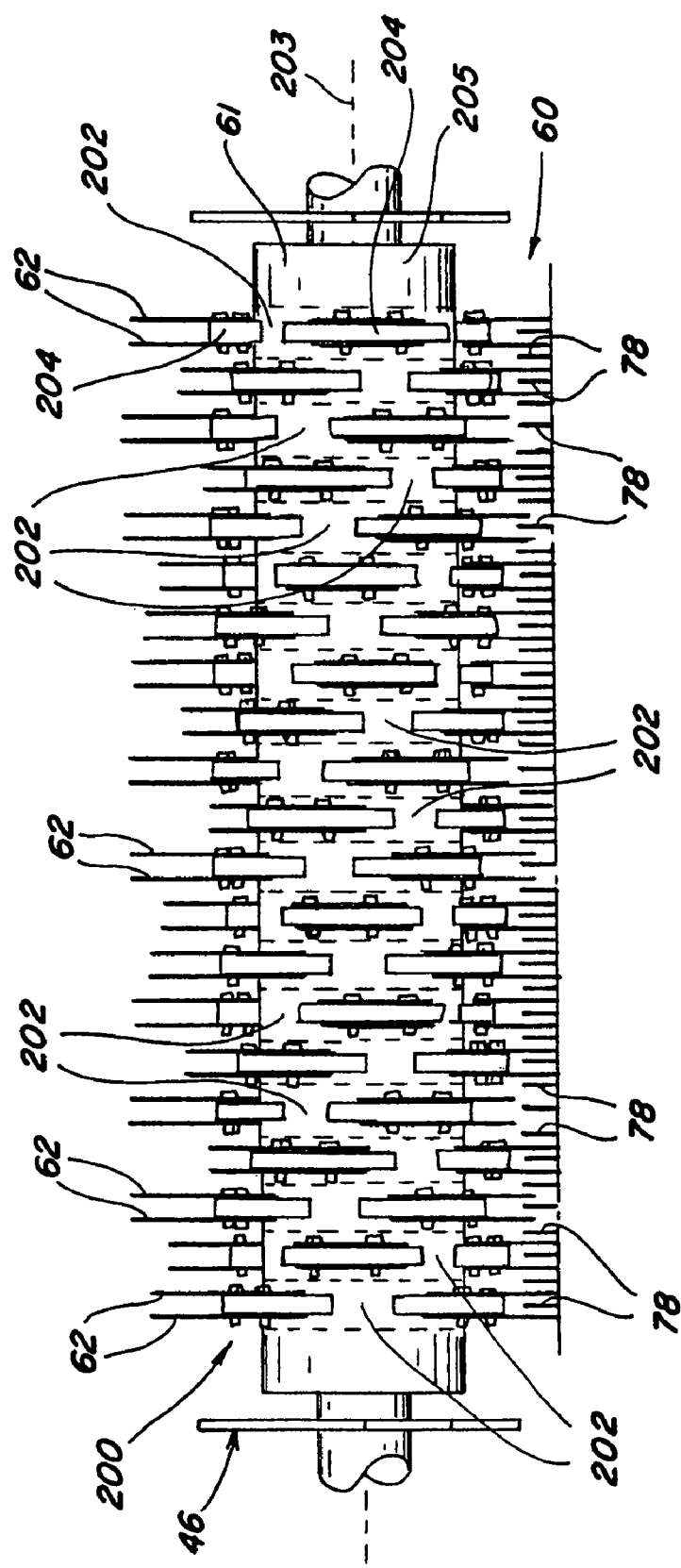
FIG. 6 is a plan view looking forwardly from the rear of the integral chopper assembly towards the rotary chopper element thereof, depicting a preferred knife blade arrangement with a plurality of generally like ring portions shown axially stacked side-by-side along the longitudinal axis of the rotary member, with the knife blades on the rotary member interengaging knife elements of the counter knife assembly of the chopper grate assembly.

Slots 68 and knife elements 78 are appropriately positioned relative to knife blades 62 of rotary chopper element 47 to permit the knife elements 78 and knife blades 62 to be interengagable with one another, especially as rotary chopper element 47 is rotated, so as to pass adjacent to one another without contacting one another. Such interengagable movement is illustrated in FIG. 6, which depicts the rotary chopper element 47 and top portions of the knife elements 78 of the counter knife assembly 60 when such knife elements 78 project through slots 68 of the grate portion 66 into the flow passageway 70 (FIG. 4). Such knife blades 62 and knife elements 78 are so mounted that they are interengageable with one another during a chopping operation without contacting or interfering with one another.

With reference again to FIGS. 3-4, the integral chopper assembly 46 therein depicted also preferably includes an adjustment mechanism 101 for adjustably varying the positioning of the counter knife bank assembly 76 relative to the grate portion 66 of the chopper grate assembly 48 between a fully engaged position wherein the knife elements 78 of the counter knife bank assembly 76 alignedly extend through the slots 68 of the grate portion 66 of the chopper grate assembly 48 at maximal projection and a fully retracted position wherein the knife elements 78 project minimally, if at all, through the slots 68. In such embodiment, knife bank 76, which extends between first and second knife bank end plates 104 and 106 thereof, with knife bank end plate 104 being behind and obscured by knife bank 106 in FIG. 4, is generally spaced from and parallel to both rotary chopper element 47 and grate portion 66, extending in a journalled arrangement between opposed side wall or plates 84 and 86 of the concave pan portion 65.

As shown in FIGS. 4-5, the counter knife bank 76, which is dimensioned to extend generally the width of the grate portion 66 between knife bank end plates 104 and 106, includes spaced mounting eyelets 108, including additional eyelets represented as being disposed along the phantom line between the representative eyelets 108 depicted in FIG. 5, along a side 110 thereof through which a shaft member 112 extends between journalled end connections 114 and 116 on the respective opposed side plates 84 and 86 of concave pan portion 65. Such shaft member 112, when so mounted through journalled end connections 114 and 116, defines an engagement positioning axis 118 (FIG. 3), sometimes hereinafter also referred to as swivel axis 118, about which knife bank 76 can be rotated in an arc-like movement.

Knife bank end plates 104 and 106 also include lower portions 124 and 126, with portion 124 being behind and obscured by portion 126 in FIG. 4, which are operatively connected, as better shown in FIG. 3, via respective positioning rods 134 and 136 to a lever assembly 138, which is operable to effect, through the coupled movement of positioning rods 134 and 136, a rotation of knife bank end plates 104 and 106 and the knife bank 76 journalled thereto about swivel axis 118, the consequence of which is the retraction of the knife elements 78 from the flow passageway 70 (FIG. 4). Lever assembly 138 includes an operable lever 140 coupled at axis 142 to a rotatable connecting rod 143 that extends between side plates or walls 84 and 86 of concave pan portion 65, which connecting rod 143 is attached to support links 144 and 146. Support links 144 and 146 are respectively connected to positioning rods 134 and 136.

With further reference to both FIGS. 3 and 4, when lever 140 is operated, as denoted by arrow G in FIG. 4, support links 144 and 146 are caused to rotate thereby effecting rotational movement of end portions 154 and 156 of support links 144 and 146 about axis 142, as denoted by arrow H in FIG. 4, consequent movement of positioning rods 134 and 136, and the resultant rotational movement of the knife bank assembly 76, including knife bank end plates 104 and 106, about swivel axis 118. By thus operating, and then fixing the status of lever assembly 138 at a given position, a user can conveniently alter and fix the positioning of the knife bank 76 relative to grate portion 66, thereby controlling to some extent the amount by which the knife elements 78 are allowed to project through slots 68.

The ability to effect a repositioning of the knife bank 76 relative to grate portion 66 is beneficial in circumstances where a user finds it desirable to be able to withdraw or retract the knife elements 78 of the counter knife assembly 60 from the flow passage 70, such as to clear obstructions as well as in circumstances where the user wishes to adjust the quality of the chop. Typically, the greater the amount of projection, the finer the chop, and the less the amount of projection, the coarser the chop.

It will be understood and appreciated by those skilled in the art that, although the position of knife bank 76 in the embodiment of FIGS. 3-4 is shown controlled by the operation of a lever assembly 138 and associated linkages, various other mechanisms and devices could equally as well be utilized to control the positioning of positioning rods 134 and 136 or, more directly, the swivel positioning of knife bank end plates 104 and 106, or even the placement of knife bank 76 closer or farther from grate portion 66. Such mechanisms and devices may be manually or automatedly operable, including remotely by a user, such as from the cab of a combine, and may include various and sundry systems and components of well known construction for effecting the desired movements, placements, or positionings.

Much of the discussion that now follows, particularly regarding FIGS. 6-13, describes noteworthy features and components of the preferred integral chopper assembly that has been developed, and the operation thereof. Inasmuch as the preferred integral chopper assembly that is so discussed is currently considered to include the best mode of the subject invention to effect the advantages sought therefor, such discussion is considered instructive and helpful to an understanding and appreciation of the manner in which the invention that is the subject of this application, which will thereafter be described and discussed in greater detail, functions and operates within the preferred integral chopper system. Consequently, the following discussion, except when it actually turns to and is directly addressing the subject invention, is not intended to, and should not be considered to, set forth requirements for or limitations to any features or components that are or may be advantageously employed with the subject invention in integral chopper systems, but should instead be considered as background information and/or as information that enhances an understanding of the subject invention and its operation.

As has been noted hereinbefore, in many previous integral chopper assembly constructions, the knife blades or paddles had been disposed on the rotary member 61 in rows and columns, though sometimes in differing array configurations. It has now been discovered that better performance and throughput, especially when the system may be operated in dual or alternative residue transport modes, as discussed hereinabove, can be realized by mounting or affixing knife blades, preferably in a side-by-side paired configuration, about the rotary member in a plurality of knife helixes, with a plurality of rings, or rows, of knife blades disposed in an ordered, or stacked, arrangement along the longitudinal axis of the rotary member 61.

In such regard, FIG. 6 shows one preferred knife blade arrangement 200 in which twenty-one (21) generally like ring portions 202 are axially stacked side-by-side along the longitudinal axis 203 of rotary member 61. As better shown in FIG. 7, which depicts an endmost, but generally representative, ring or row portion 202 on rotary member 61, three mounts or mounting lugs 204, sometimes hereinafter referred to more simply as lugs, are affixed, such as by welding, to the outer periphery 205 of rotary member 61 at spaced annular intervals that are generally equal to one another, in this instance with the midpoints of the lugs 204 being spaced approximately 120° apart.

As may best observed from FIGS. 7-10, each lug 204 is preferably designed to include a central yoke member 206 of a predetermined yoke thickness $Yt$ (as better observed in FIGS. 8-9) that has an end-to-end yoke length $Yl$ (as better observed in FIG. 7) and extends around a portion of the rotary member 61 to which individual knife blades 62 can be mounted, preferably in pairs, but also singly, if so desired.

Preferably, the leading end or edge 207 of the lug 204 is beveled so that any residue flowing into such leading edge 207 will be directed upwardly and over, or around, the lug 204 instead of hairpinning against the leading edge thereof.

In the embodiment depicted in FIGS. 5-10, the individual knife blades 62 are shown connected to the lugs 204 by nut and bolt arrangements 208 to form a mounted assembly 209, although other connection techniques and constructions could be equally as well employed for such purpose and to like effect.

Figure 7:
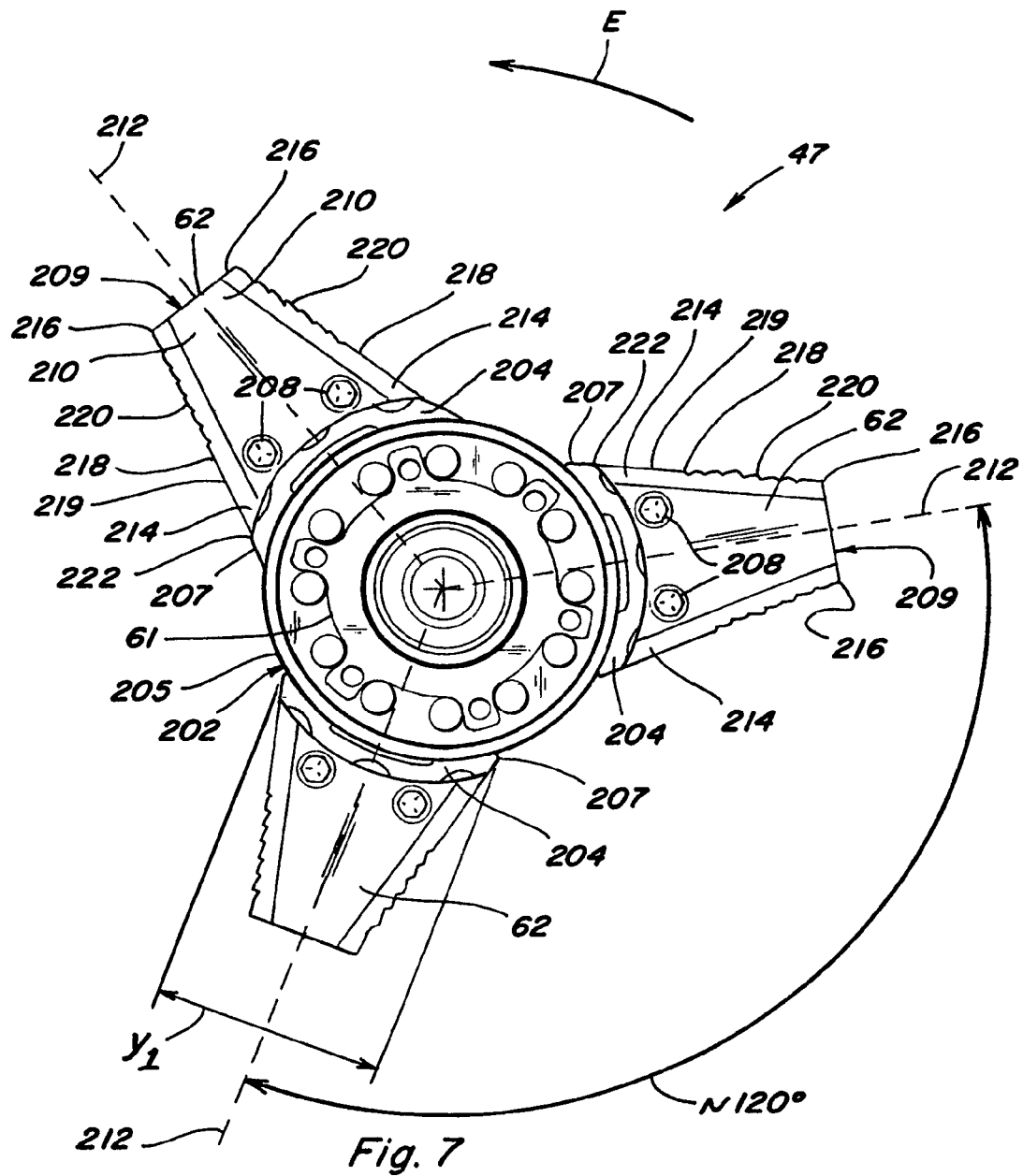
FIG. 7 is an end plan view of the rotary chopper element depicted in FIG. 6, showing the endmost, but generally representative, ring portion on the rotary member.
Figure 8:
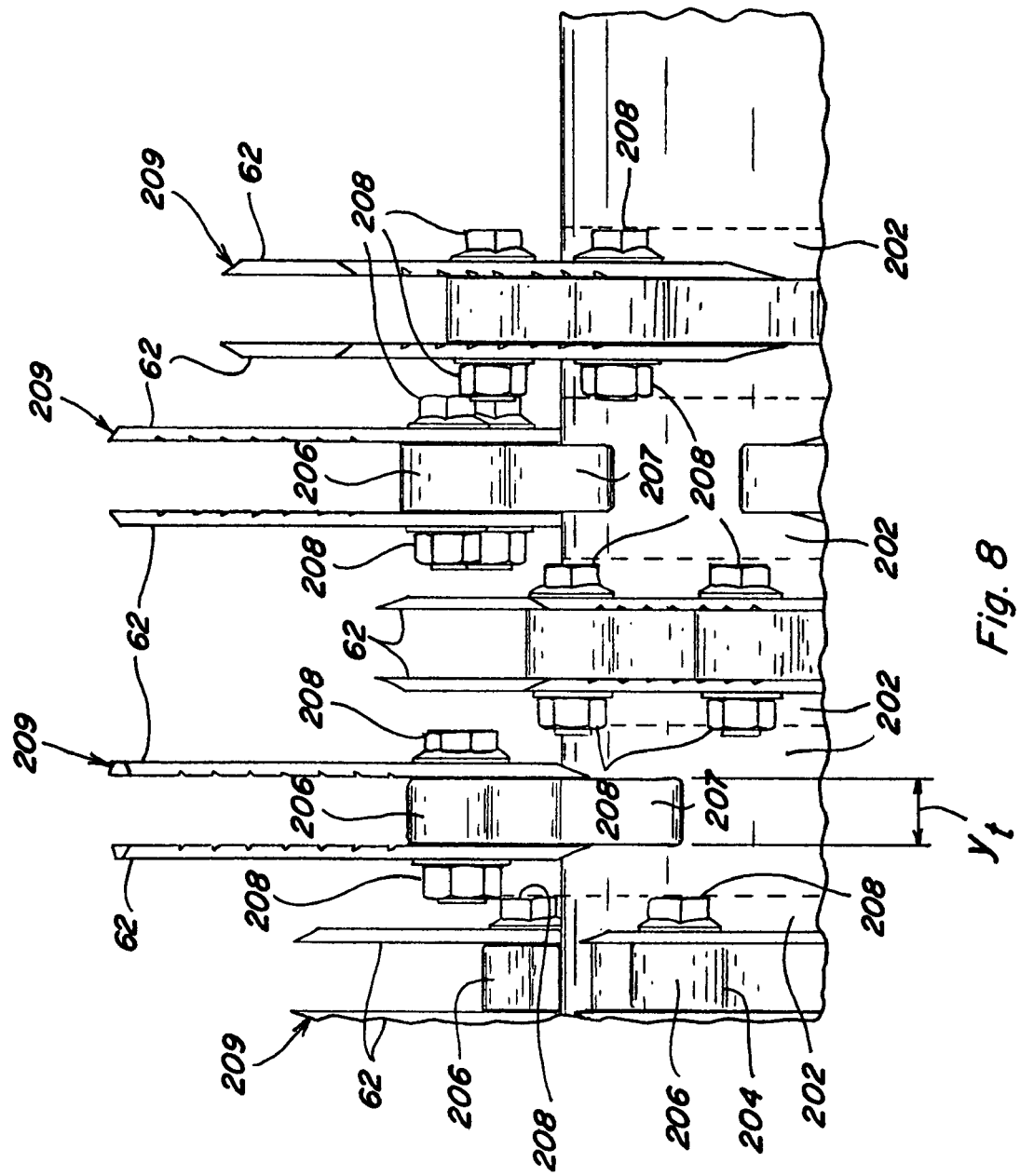
FIG. 8 is an enlarged view of a portion of the rotary chopper element of FIG. 6, showing in greater detail the relationship of certain components of such rotary chopper element.
Figure 9:
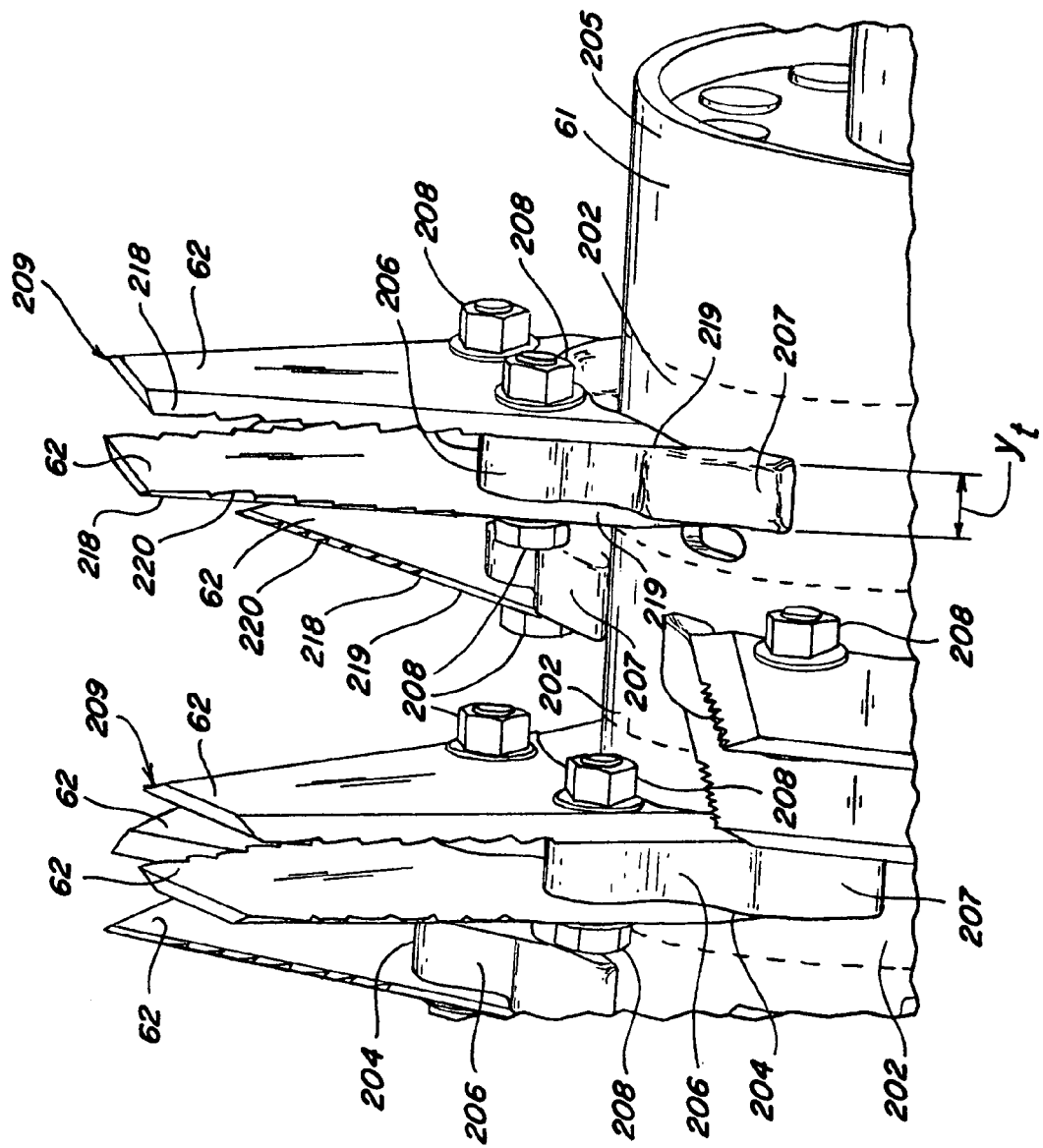
FIG. 9 is an enlarged perspective view of a portion of the rotary chopper element of FIG. 6, also showing in greater detail the relationship of certain components of such rotary chopper element.

As may be better observed in FIG. 7, the individual knife blades 62 are preferably formed to include two mirror image portions 210 about a center line 212 and are beveled from their bases 214 to their tips 216 to form cutting edges 218, portions 220 of which may be serrated. Such mirror image design permits easy reversibility of a blade on a mounting lug when the leading cutting edge becomes dulled so that the still sharpened mirror image cutting edge can thereafter be utilized as the leading cutting edge. Knife blades of such design may be connected to the mounting lugs 204 as shown in FIGS. 5-10 such that the leading edges 207 of the lugs 204 and the leading cutting edges 218 of the mounted knife blades 62 together form a continuous beveled leading edge 219 for the mounted assembly 209, though perhaps, as better shown in FIG. 11, with a discontinuity at the point 222 where the leading cutting edge 218 of knife blade 62 meets the leading edge 207 of lug 204.

Figure 10:
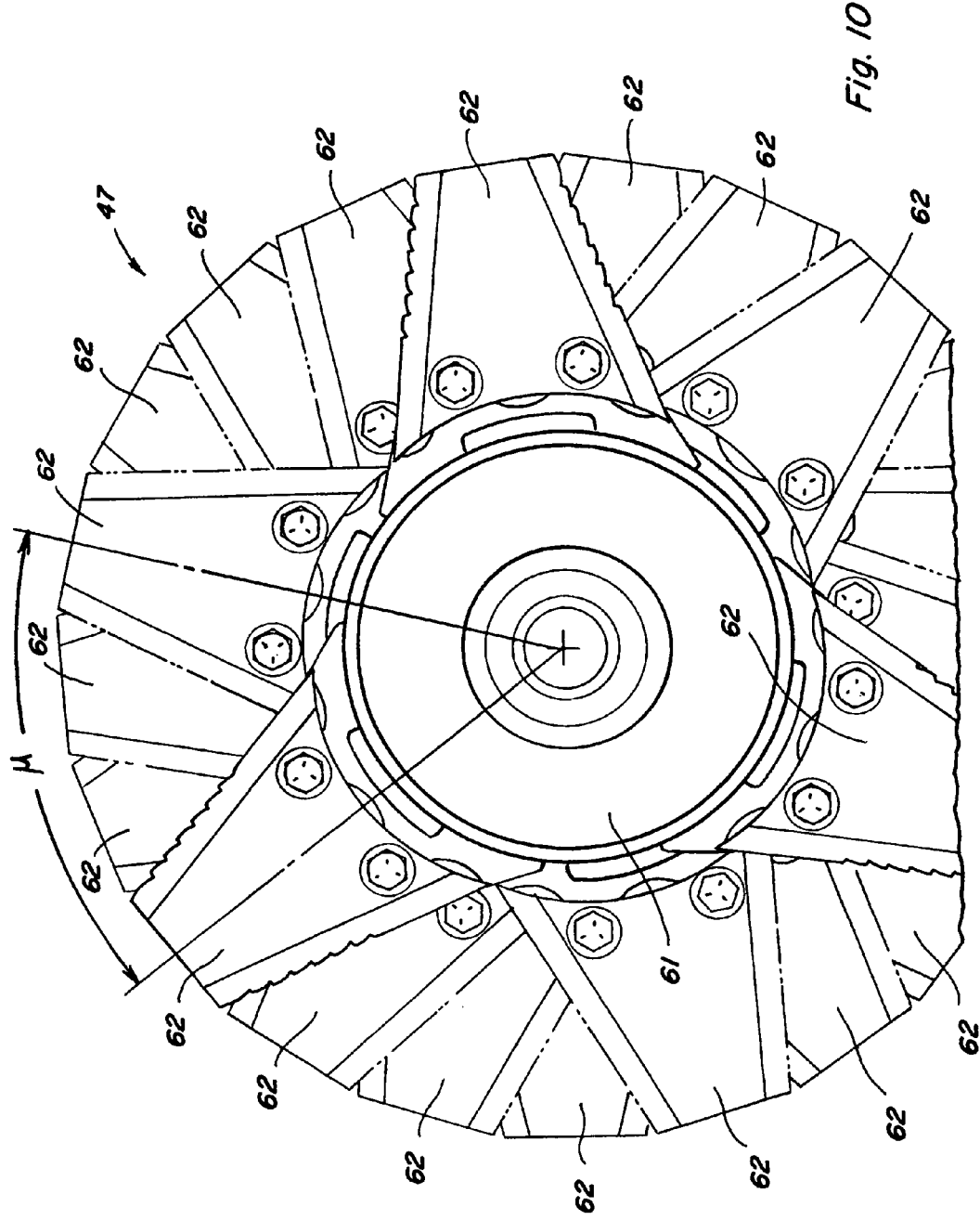
FIG. 10 is an enlarged partial end view of the rotary element of FIG. 6, similar in some respects to FIG. 7, but also showing the knife blades as mounted on additional ring portions along the rotary member and illustrating a preferred radial offset between the knife blade mountings on successive ring portions.
Figure 11:
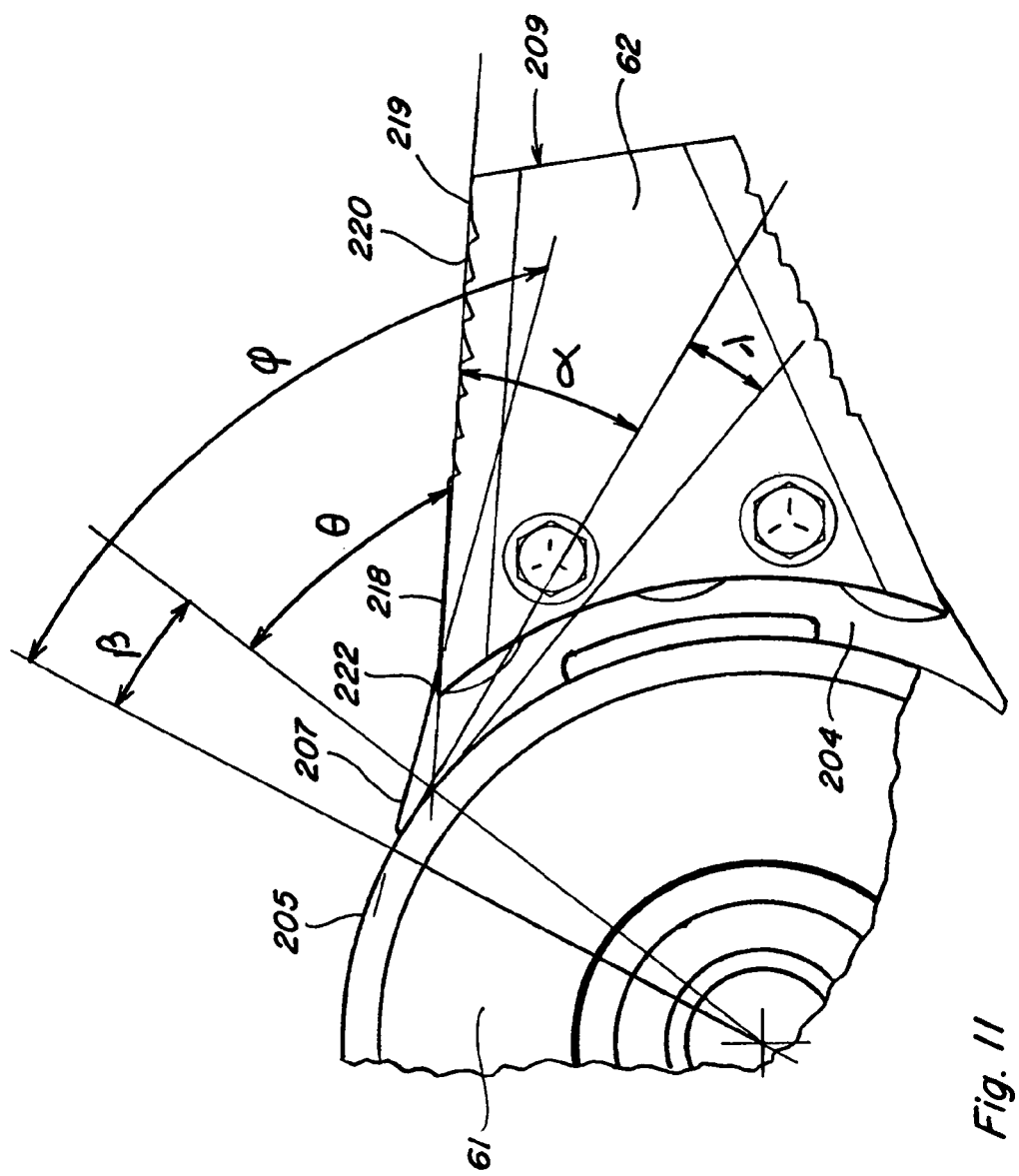
FIG. 11 an enlarged partial end view of the rotary chopper element of FIG. 6, similar in some respects to FIG. 7, but showing only a single mounted assembly on the ring portion and illustrating various angular relationships between certain elements thereof.

With the particular embodiment of FIGS. 5-11, as is better observed in FIG. 11, the leading edges 207 of lugs 204 and the leading cutting edges 218 of knife blades 62 are raked back from perpendicular by differing amounts. As shown in FIG. 11, in such preferred embodiment the leading edge 207 of lug 204 is raked back at an angle φ of approximately 75° and the leading cutting edge 218 of knife blade 62 is raked back at an angle θ of approximately 55°, with the angle β of displacement or offset of the point of intersection of the leading cutting edge 212 of knife blade 62 with the rotary member 61 from the point of intersection of the leading edge 207 of lug 204 with the rotary member 61 being approximately 10°. With such an embodiment, angle α is approximately 25° and angle λ is approximately equal to angle β. For embodiments such as shown in FIGS. 5-11, it is considered desirable that angle β, and so also angle λ, within a range of about 10°-20°.

Figure 12:
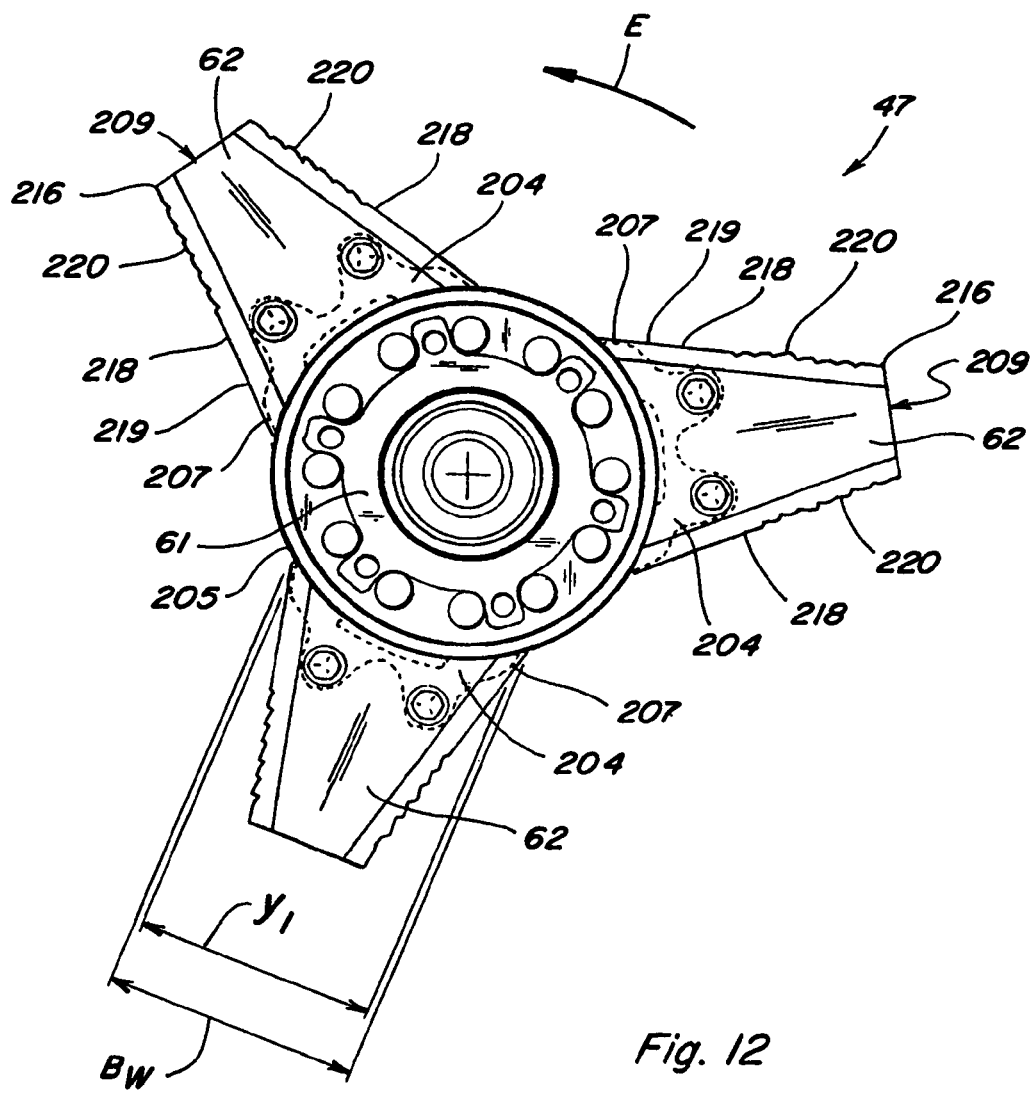
FIG. 12 is an end plan view of the rotary chopper element depicted in FIG. 6, similar in many respects to FIG. 7, but with an alternative mounted assembly wherein the blade width of the knife blades mounted to a mounting lug is greater than the yoke length of the mounting lug.

Even more preferably, however, as shown in FIG. 12, the knife blades 62 may be formed to have a blade base width Bw that is greater than the yoke length Yl so that the blade 62 can be so mounted to the lugs 204 to generally span the entire length Yl of the yoke member 206 and to project slightly beyond the opposed ends of the yoke member 206, with the cutting edges 218 of the knife blades 62 extending down to the outer surface of the rotary member 61. Due to the curvature of the outer surface of the rotary member 61, and for the knife blades to properly be engagable with the mounting lugs 204, the base portions of knife blades having such features will generally have a concave profile or a recessed center portion between the cutting edges 218. With knife blades of such design, the leading cutting edge 218 will extend from the rotary member 61 to the tip 216 of the knife blade 62 and be presented as the leading edge 219 of the mounted assembly 209.

In general, regardless of the particular knife blade and lug configurations, the leading edge 219 of the mounted assembly 209 will be disposed to lie between the position of a perpendicular to the rotary member 61 and a tangent to the rotary member 61, i.e., at a rake angle ε where $0° < ε \leq 90°$, although the height, as well as the leading edge design, of the lug 204 to which the blade 62 is attached may limit the maximum rake angle realizable, especially since it is desired that the leading edge 219 of the mounted assembly 209 presented to the residue passing between the rotary element 47 and the chopper grate assembly 48 be beveled, preferably with the knife blade 62 forming the leading edge, to minimize hairpinning of residue against such leading edge.

The ring portions 202 of rotary member 61 are axially stacked relative to one another along the longitudinal axis 203 (FIG. 6) of the rotary member 61, with the lugs 204 of each succeeding ring portion 202 being rotated or radially offset from the lugs 204 of the preceding ring portion by about 54.1±15°, as best observed in FIG. 10, wherein angle μ is approximately 54.1°, resulting in three (3) generally parallel blade helixes that wrap around the length of rotary member 61. With such a noted offset of 54.1±15° and twenty-one (21) ring portions, each helix will wrap around the rotary member between about two (2) and four (4) times, which arrangement has been found advantageous for advancing crop residue between the rotary member 61 and the chopper grate assembly 48, regardless of whether the rotary member is being rotated at about 3000 RPM or 800 RPM and regardless of whether or not the counter knife assembly 60 is positioned in an engaged or retracted position.

For ease of reference, such knife blade arrangement may hereinafter sometimes be referred to a 3×3 rotor array due to the positioning of three mounting lugs at spaced locations around each ring portion. Depending upon desires of users and the particular designs of mounting lugs and knife blades utilized, greater or lesser pluralities of mounting lugs can be positioned around each ring portion to obtain knife blade arrangements with greater or fewer generally parallel helixes on the rotary member 61.

Figure 13:
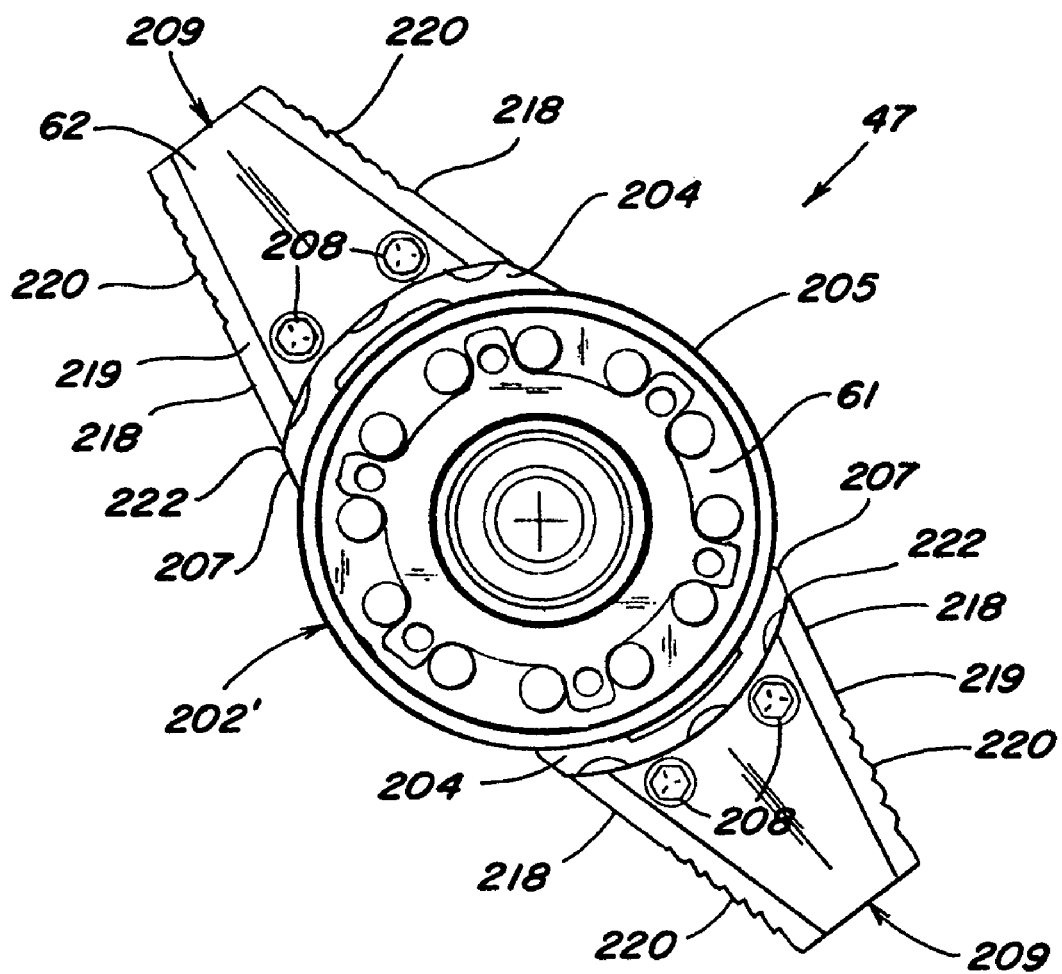
FIG. 13 is an end plan view of the rotary chopper element depicted in FIG. 6, similar in many respects to FIG. 7, but with ring portions that include only two mounting lugs therearound.

By way of illustration, and not of limitation, FIG. 13 depicts an alternate preferred rotary element embodiment that utilizes ring portions 202' that have two mounting lugs 204 positioned annularly around each ring portion, approximately 180° apart, instead of three mounting lugs spaced approximately 120° apart. The alternate knife blade array realized with the utilization of such ring portions 202' is sometimes referred to as a 2×3 array. Such 2×3 array results in a less dense knife blade arrangement on the rotary member 61, thus allowing easier access to the mounting lugs and easier setup and installation of knife blades 62 on the rotary member 61, though perhaps with some trade-off relative to the effectiveness of the resulting rotary assembly in transporting the residue rearwardly.

Obverse trade-offs may apply if greater numbers of mounting lugs are disposed around ring portions of the rotary member 61. The particular designs of the mounting lugs and knife blades may influence the extent to which such trade-offs may impact overall performance and maintenance of the integral chopper assembly.

From previous discussions hereinabove, it should be appreciated that, when the counter knife assembly 60 is in an engaged position, with the knife elements 78 thereof projecting between slots 68 of the grate portion 66 of chopper grate assembly 48, with rotary member 61 being rotated at about 3000 RPM, the knife blades 62 on the rotary member 61 will thus serve to transport residue contacted thereby rapidly towards the rear of combine 10 and, while doing so, will also interact with the knife elements 78 of the counter knife assembly 60 to chop or cut the residue into smaller pieces. Alternatively, especially if the counter knife assembly is positioned in its retracted position, with the knife elements 78 thereof being retracted within slots 68 of the grate portion 66 of chopper grate assembly 48, with rotary member 61 being rotated at a lesser rate of about 800 RPM, the knife blades 62 on the rotary member 61 will likewise serve to transport residue contacted thereby towards the rear of combine 10, but more slowly and with less damage to the crop residue, as a consequence of which longer and larger pieces of residue will be transported rearwardly in combine 10.

While the foregoing description and discussion of various features of the improved integral chopper assembly 46 of which the present invention is a part is instructive and helpful to an understanding and appreciation of the present invention and its practice, particularly as such invention is included within such integral chopper assembly 46, it must be borne in mind that such invention is but a part of such integral chopper assembly 46 and that many of the features described and discussed in some detail hereinbefore, including features such as the arrangement of the knife blades 62 around rotary member 61 and the design of the mounted assemblies 209 formed by the mounting lugs 204 and knife blades 62, are not considered critical to or to be a part of the invention of this application and its practice, which invention has been addressed only relatively briefly in the detailed description hereinabove, principally with regard to FIGS. 1-5. Accordingly, attention is now directed more specifically to knife bank assembly 76 of the counter knife assembly 48 of the integral chopper assembly 46, and more particularly to various features thereof that illustrate the present invention.

As has been noted previously, especially when the integral chopper assembly 46 is operated to effect a finer chop of the residue, there exists a possibility that a rock or other more solid object in the residue flow may impact a knife blade 62 or knife element 78 as the residue passes between the rotary element 47 and the chopper grate assembly 48. In general, the possibility of resulting damage to the knife blades 62 and knife elements 78, including the breaking off of such a knife blade or knife element, may be somewhat greater for the knife elements 78 due to their rather stationary position as opposed to the knife blades 62 that are being rotated in the direction of flow of the crop residue.

With prior art flail-type beaters and choppers, some insurance against catastrophic failure has been available in the form of the rotating beater elements that could pivot rearwardly as they passed a foreign object captured by stationary knife assemblies. With the improved chopper assembly 46 discussed hereinabove, in which the knife blades 62 on the rotary member 61 remain fixed, insurance against catastrophic failure has had to be otherwise developed, which development has proved challenging.

It has been found that much the same effect as with the flail-type beaters and choppers can be realized with the present integral chopper assembly 46 by permitting individual knife elements 78 in the counter knife assembly 60 to relax or retract through slots 68 in the gate portion 66 to allow a foreign object, such as an object being carried rearwardly by the rotation of the rotary member 61 and the knife blades 62, to pass through the passageway 70 and to continue rearwardly in the combine 10. In at least some respects, such action is preferable to that described for the flail-type beaters and choppers since, with such flail-type systems, the foreign object may remain captured or trapped by the stationary knives thereof, whereas, with the current system, the object may be able to pass rearwardly beyond the integral chopper assembly 46.

In light thereof, and in view of the advantages that can be realized by providing a counter knife assembly 60 that can absorb the impact of an undesired collision or impact with a foreign object, the counter knife assembly 60 of the preferred integral chopper assembly 46 addressed herein includes features that, in conjunction with the features of the preferred rotary chopper element 47 discussed hereinabove, including the arrangement of the knife blades 62 about the outer surface of rotary member 61, result in improved performance by the integral chopper assembly 46, including the transport of foreign objects through the integral chopper assembly 46 with minimal damage to the knife blades 62 of the rotary member 61 and the knife elements 78. The counter knife assembly 60 includes several features considered to be of some significance in providing such improved performance.

One feature permits individual knife elements 78 to relax or retract under conditions of heavy loading, such as impact with a more solid foreign object, so as to prevent significant damage to or breakage of that knife element 78. Another feature permits the knife elements 78 to be removably replaceably affixed to retainment mounts of a knife bank, instead of being welded in place, so as to allow easy replacement of damaged knife elements and/or reseating of individual retracted knife elements 78. A further feature permits side-to-side adjustability of the knife bank so that a user can more easily align or center the knife elements 78 within slots 68 of the grate assembly 66 and for interengagement with the knife blades 62 of rotary member 61 as the chopper assembly 46 is operated, including in the event that replacement of knife elements 78 becomes necessary.

FIGS. 14-18 depict counter knife assemblies, and components thereof, that may be employed as the counter knife assembly 60 of FIGS. 3-4 in such a way as to better illustrate the manner in which the knife elements 78 are mounted or affixed to knife bank 76. In the preferred embodiments depicted in FIGS. 14-18, knife bank 76, which is dimensioned to extend between knife bank end plates 104 and 106 and generally the width of the grate portion 66 (FIGS. 3 and 4), includes a trough bracket 230 disposed between knife bank end plates 104 and 106, with a plurality of retainment mounts 232 spaced therein and therealong, to each of which retainment mounts 232 at least one knife element 78 may be attached. Preferably, however, as better shown in FIGS. 15 and 18, each retainment mount 232 will be capable of having two spaced, knife elements 78 mounted thereto in a side-to-side arrangement, which knife elements 78 may be of conventional designs and include spaced mounting holes 234 near the bases 236 thereof.

Figure 14:
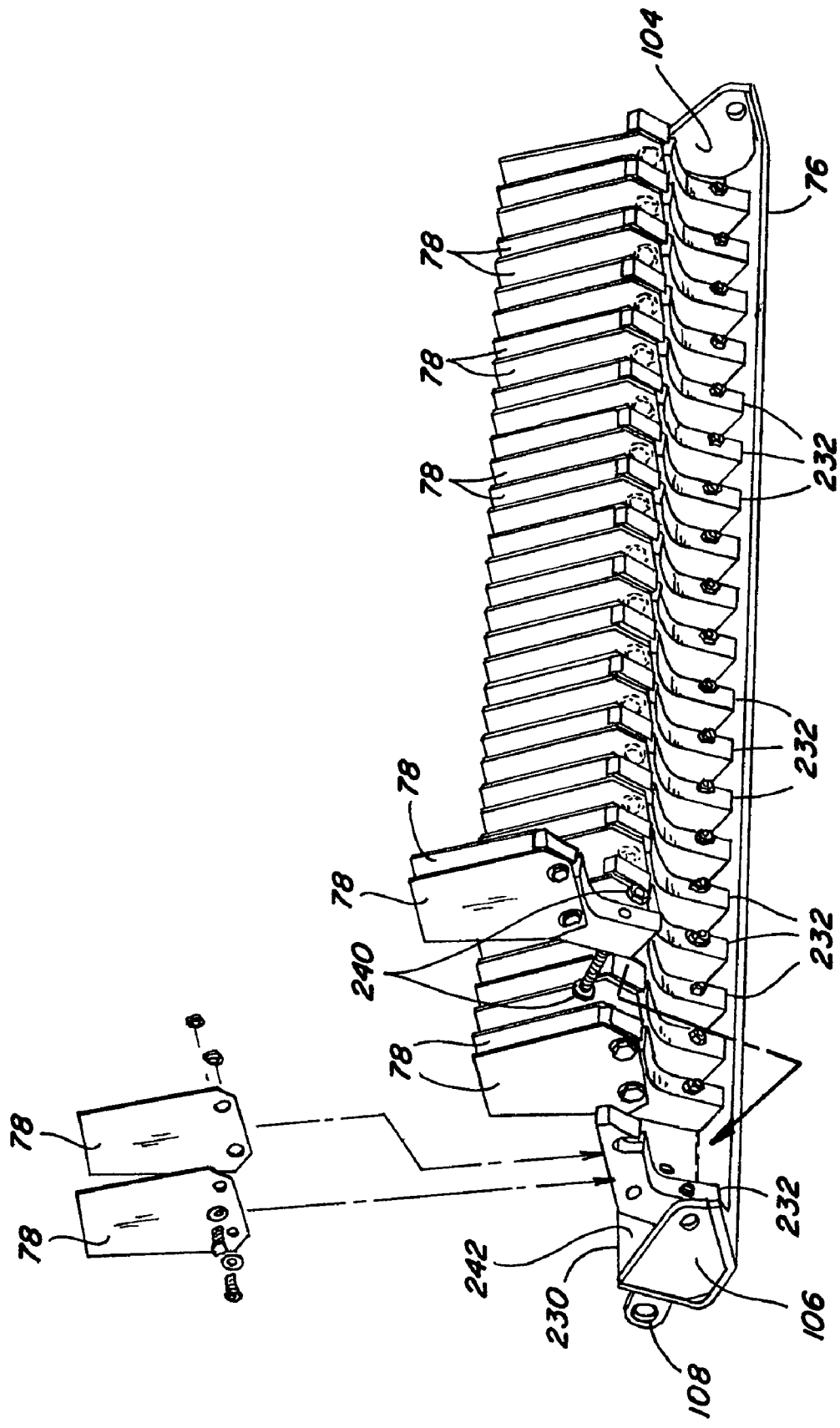
FIG. 14 is a perspective view of a preferred knife bank assembly of the chopper grate assembly of the integral chopper assembly.
Figure 15:
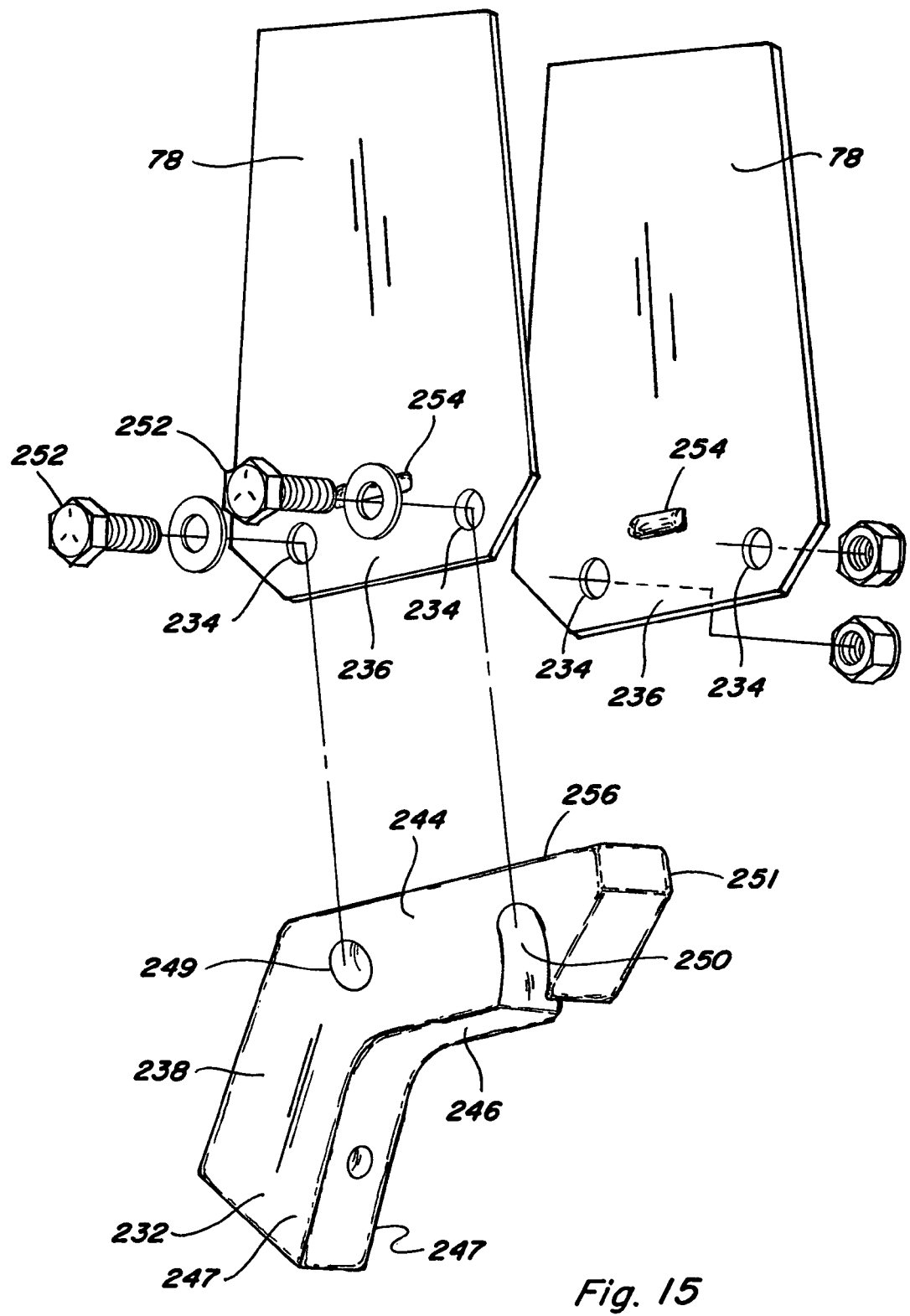
FIG. 15 is an enlarged perspective view of a retainment mount of the knife bank assembly of FIG. 14.
Figure 16:
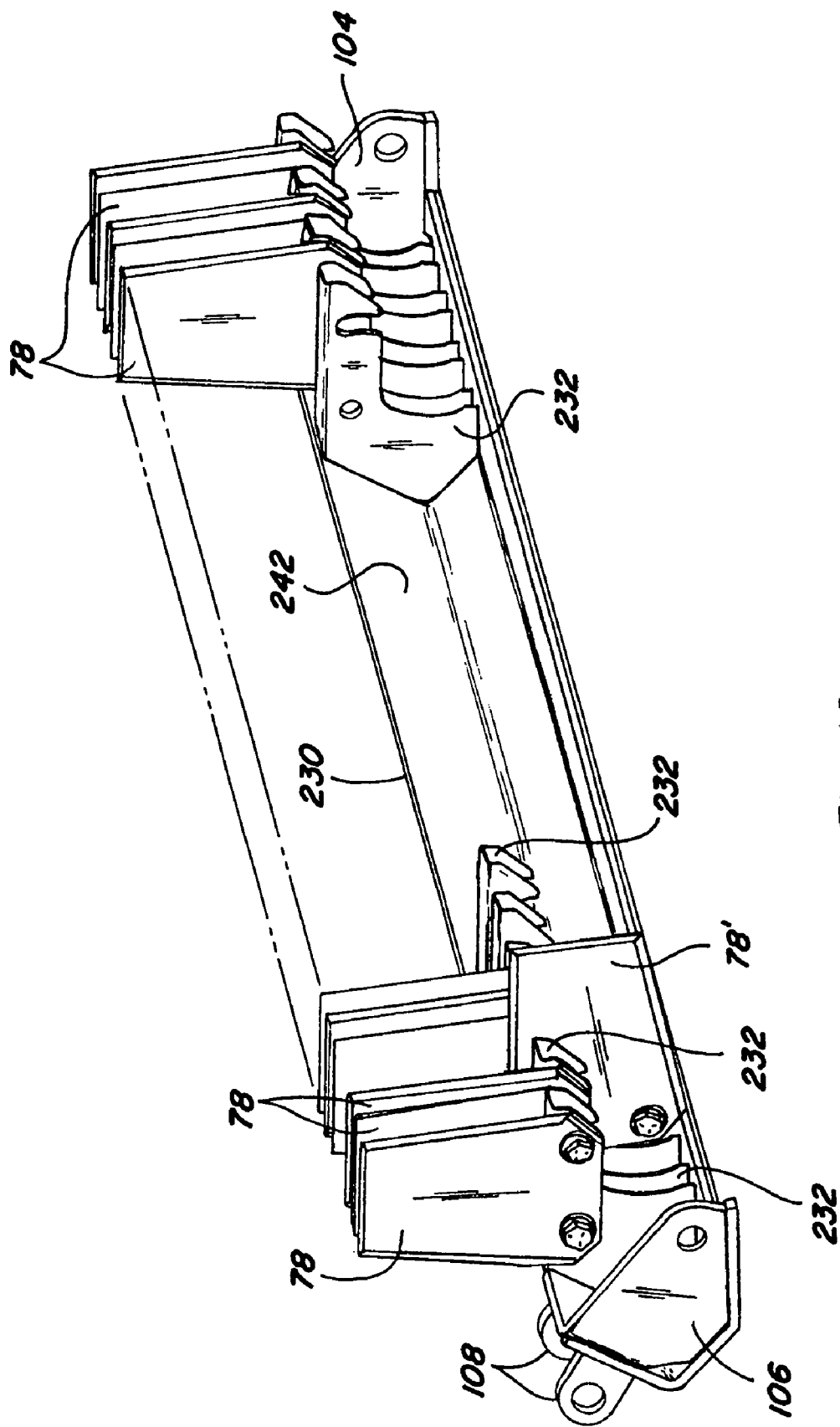
FIG. 16 is a perspective view of an alternative knife bank assembly of the chopper grate assembly of the integral chopper assembly, similar in some respects to FIG. 14, showing one of the knife elements thereof in a displaced position.
Figure 17:
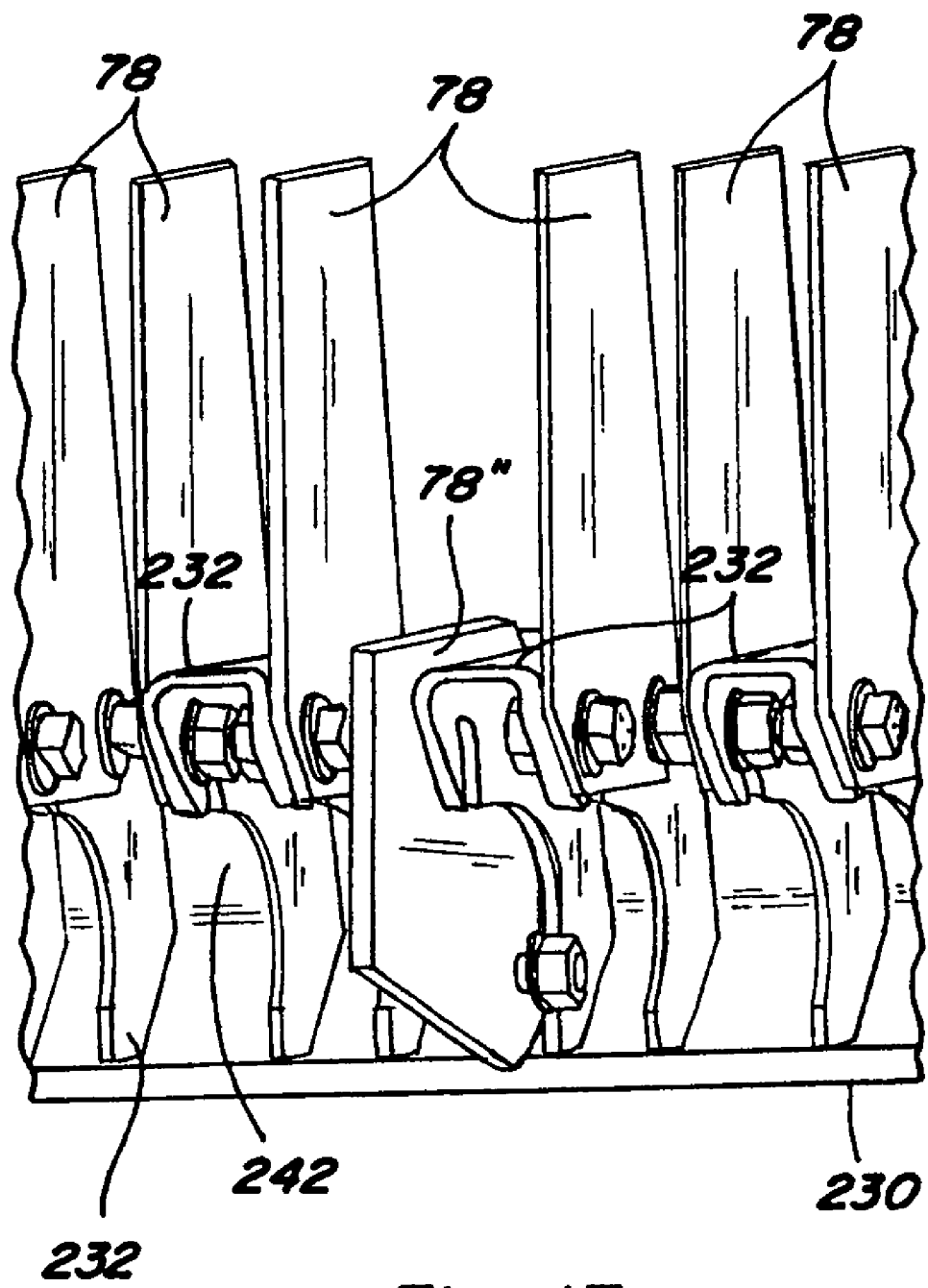
FIG. 17 is a view of a different perspective view of the alternative knife bank assembly of FIG. 16, similarly showing one of the knife elements thereof in a displaced position.
Figure 18:
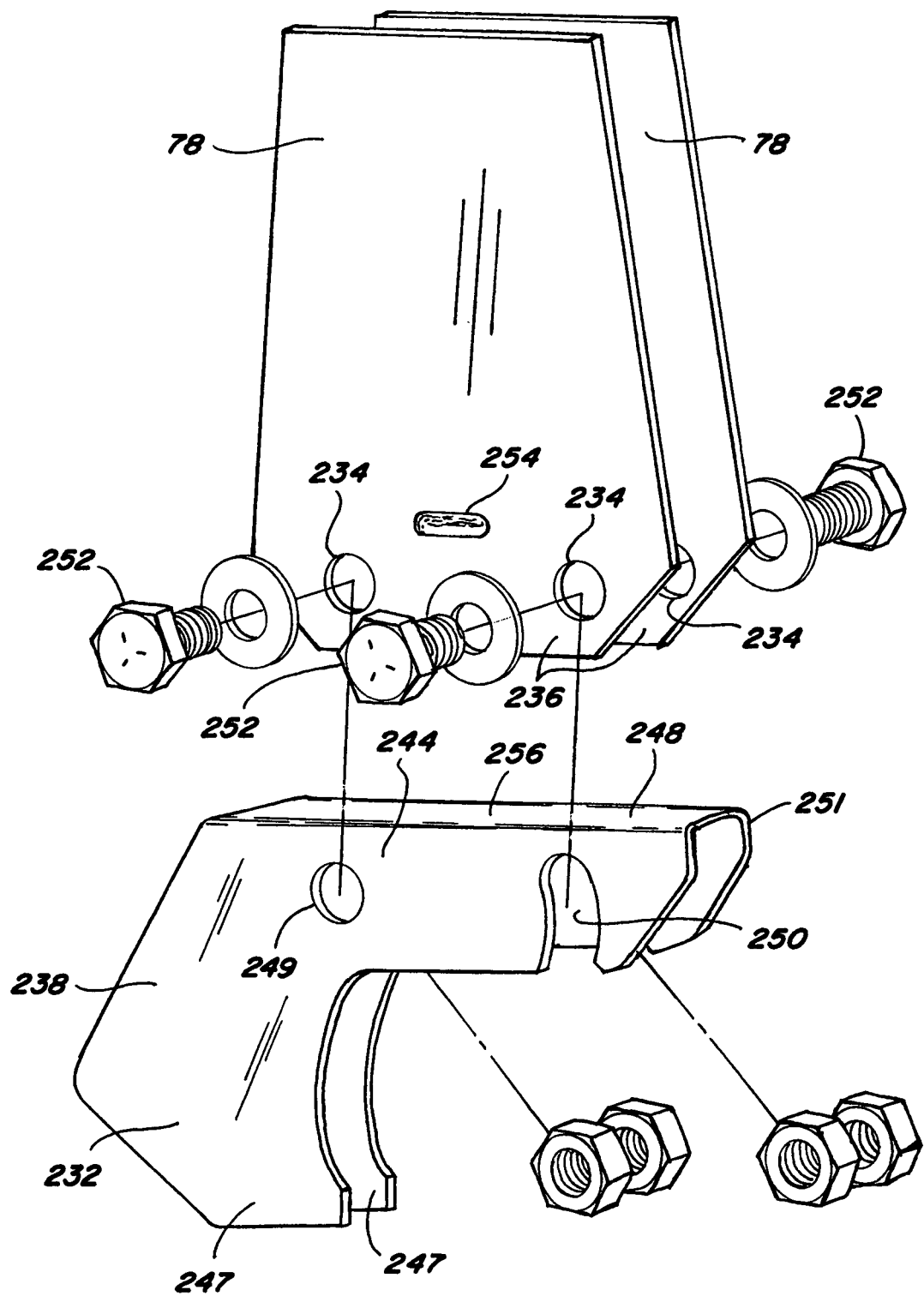
FIG. 18 is an enlarged perspective view of a retainment mount of the knife bank assembly of FIGS. 16 and 17.

Each retainment mount 232, of which two variations are shown in FIGS. 15 and 18, is preferably generally pistol-shaped with a grip portion 238 attachable, as by a nut and bolt mounting 240 in FIG. 14 or by welding in FIGS. 16 and 17, along the interior side 242 of the extended trough bracket 230, and a generally flat-sided barrel portion 244 extending outwardly from its juncture with the grip portion 238. In the variation depicted in FIG. 15, each retainment mount 232 includes a central body portion 246 between side walls 247, whereas the variation depicted in FIG. 18 includes only a central web portion 248 between side walls 247.

Along the barrel portion 244 of each retainment mount 232 are disposed a mounting hole 249 positioned closer to the grip portion 238 and a mounting slot 250 positioned closer to the distal end 251 of the barrel portion 244. Nut and bolt pairs 252 are utilized to mount the knife elements 78 to the retainment mounts 232, with a first nut and bolt pair associated with mounting hole 249 and one of the spaced mounting holes 234 of a knife element 78 and a second nut and bolt pair associated with mounting slot 250 and the other of the spaced mounting holes 234 of that knife element 78.

When the knife bank 76 is mounted and the various other components of the chopper grate assembly 60 so assembled and configured as depicted in FIG. 3, with the knife elements 78 of the knife bank 76 projecting through slots 68 of grate portion 66, crop residue will be transported through passageway 70 as the knife blades 62 of the rotary member 61 rotate past the knife elements 78 of knife bank 76 in the interengageable fashion as depicted in FIG. 6. If a rock or other foreign object impacts one or more given knife elements 78 of knife bank 76 with sufficient force to overcome the clamping force of the nut and bolt pair 252 associated with mounting slot 248, such knife element 78 may rotate about an axis formed by the nut and bolt pair 252 associated with mounting hole 246, as is shown in FIGS. 16 and 17 wherein knife elements 78' and 78" are shown rotated to displaced or relaxed positions.

Such displaceability of individual knife elements under conditions of extreme loading helps minimize the possibility of a catastrophic failure resulting from impacts with foreign objects while allowing continued operation until such time as a user may desire to reset the displaced knife element. So long as only a minimal number of knife elements have been displaced, and if operation of the integral chopper system otherwise remains acceptable, a user may be able to delay the resetting of the displaced knife elements until a more convenient time, resulting in less down time and improving harvesting efficiency.

As between the retainment mount 232 variations depicted in FIGS. 15 and 18, the variation of FIG. 15 offers an advantage not realizable with retainment mounts that are or must be welded to the trough bracket 230 or like member in that such individual retainment mounts 232 may be individually replaced in the event of damage thereto, instead of requiring replacement of the entire trough bracket 230 or like member. Additionally, the use of such retainment mounts allows the trough brackets to be more easily built up, without the difficulties that are inherent with welding the individual mounts in place, including difficulties in effecting proper positioning and spacing of the knife elements along the trough bracket.

While such constructions are the presently preferred constructions for effecting displacement of a knife element under extreme loading conditions, it should be recognized that other embodiments for effecting like displacement could be equally as well employed, including constructions that employ shear bolts in conjunction with a second mounting hole instead of the nut and bolt pair with the mounting slot, systems that employ spring loading, either compression or tension, to hold a knife element in its extended position until loading on the knife element overcomes the spring force, or other systems that are operable to similar effect.

Additionally, to help prevent premature or inadvertent rotation of the knife element 78, features, such as a surface dimple, as will be further discussed hereinbelow, may be added to either the surface of the knife element 78 or the retainment mount 32. Other techniques and constructions can also be employed to increase the resistance to rotation until the critical impact load is experienced and to retain the knife element 78 in its normal extended position. Such techniques and constructions may include or make use of metal forming, welding, or chemical surface coatings that increase the sliding friction of the knife element against the side walls 247 of the barrel portion 244 of retainment mount 232. In the preferred embodiments depicted in FIGS. 15 and 18, a dimple 254 is shown formed into the metal surfaces of the knife elements so that, when the knife element 78 is mounted to the retainment mount 232, such dimple 254 will be located generally parallel and slightly above the top edge of a side wall 247, extending slightly over the top side 256 of barrel portion 244.

In the past, during the installation and setup of integral chopper assemblies, rotary assemblies have typically been installed first, followed by installation of the chopper grate assemblies. With the grate portions of such chopper grate assemblies in place as part of the concave pan portion, various difficulties were often encountered in aligning the knife elements of the counter knife assemblies with the slots of the grate portions and in ensuring the interengagement of the knife blades of the rotary member with the projecting knife elements of the counter knife assembly so that the knife blades could rotate past the knife elements without coming in contact therewith. Such alignment activities have been time consuming and frustrating to users.

With the knife bank assembly 76 as described hereinabove, difficulties in aligning the knife elements 78 with the slots 68 of grate portion 66 are minimized since the counter knife assembly 60 can be easily slidably moved along shaft member 112 to properly position the knife bank assembly 76 and the knife elements 78 thereof relative to slots 68. If the adjustment mechanism 101 of the counter knife assembly 60 is so designed that it will allow the retraction of knife elements 78 within slots 68 so that the tops of such knife elements 78 are approximately flush with the upper surface of the grate portion, but not totally withdrawn from such slots 68, such knife elements 78 will generally remain in alignment with and be self aligning with such slots 68 due to the ability of the trough bracket 230 to slide along shaft member 112.

Other features of the integral chopper assembly 46 presented herein also act or operate in conjunction with the several features that have already been addressed in significant detail hereinabove to improve the overall effectiveness of such integral chopper assembly 46. For the purpose of providing a better and/or more complete understanding of the present invention as it operates in such integral chopper assembly 46, several of such other features and their operations are therefore further described hereinafter.

In light of the foregoing discussion, it should be apparent that, with the constructions described and discussed hereinabove, the preferred integral chopper assembly 46 is thus operable to transport the crop residue, including foreign objects therein, rearwardly within the combine 10 and to also chop the residue, especially when the rotary member 61 is operating near 3000 RPM and the counter knife assembly 60 is positioned with its blade elements 78 extended through slots 68 in grate portion 66 to project into the pathway 70 between the rotary element 47 and the chopper grate assembly 48. As such transport and chopping occurs, the residue is flowing along the upper surface of concave pan portion 65. By providing as part of the concave pan portion 65 an interruption plate that extends cross-wise or crossways across the concave pan portion 65 along the upper surface thereof, residue flowing along such upper surface can be briefly stalled or impeded when it encounters such interruption plate. Such flow interruption permits the residue to be chopped into shorter pieces, resulting in a lower mean length of chop (LOC) as the integral chopper assembly operates.

Figure 19:
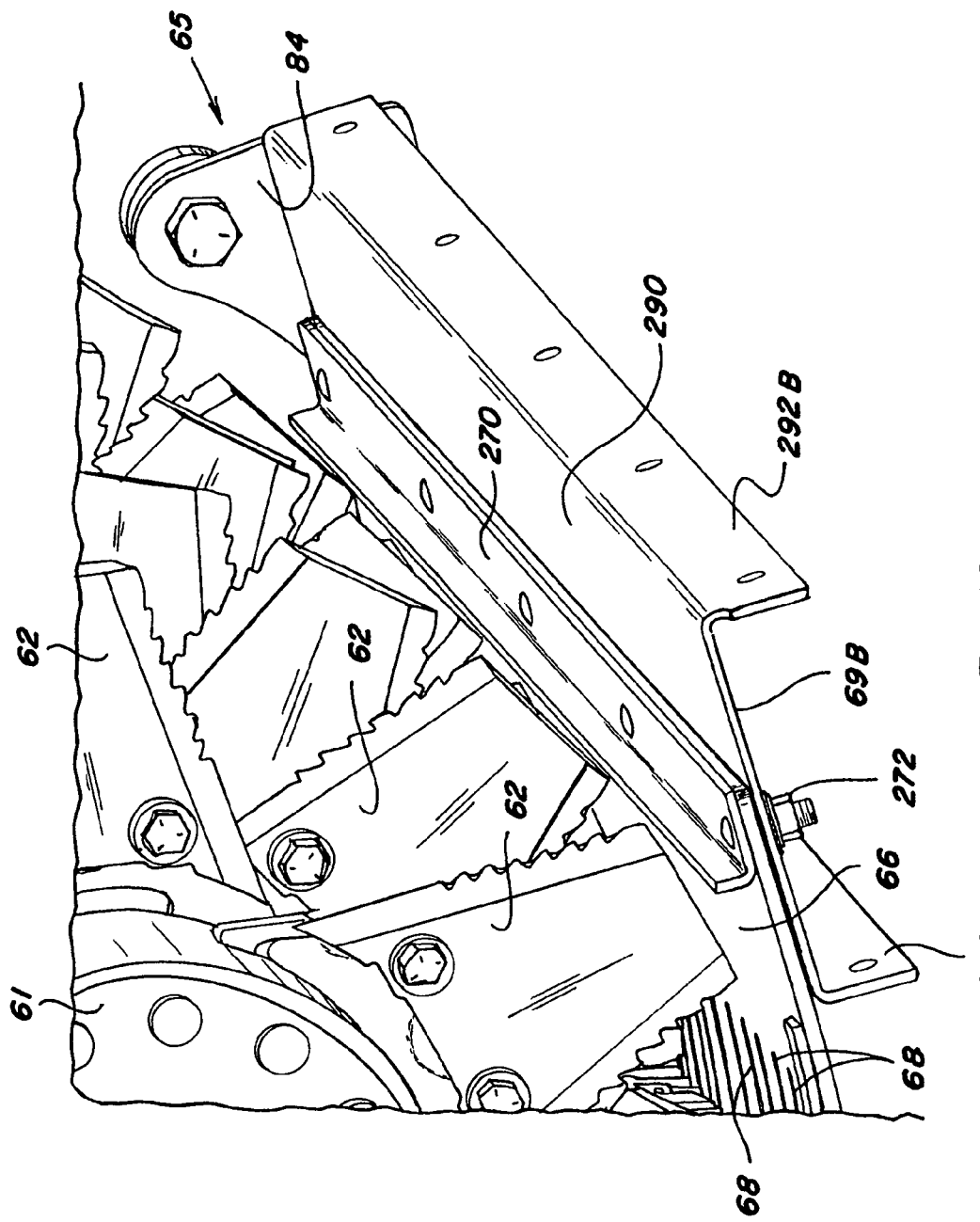
FIG. 19 is a perspective view of a portion of the chopper grate assembly, including an interruption plate installed downstream of the slots in the grate portion.

Preferably, as shown in FIG. 5, and as better shown in FIG. 19, such an interruption plate 270, which may preferably take the form of a bar of L-shaped cross-section, with its base resting upon the upper surface of the concave pan portion and its leg projecting upwardly into the passageway 70 (FIG. 4) between the rotary element 47 and concave pan portion 65, may be positioned downstream of the slots 68 through the grate portion 66, as shown in FIG. 19, by an amount to obtain the desired LOC. Interruption plate 270 is preferably operatively connected to trailing plate 69B of concave pan portion 65 by any suitable connection construction, such as the nut and bolt construction 272. While the height of the interruption plate is not considered to be critical to the design of the interruption plate, it has been found desirable, with currently available integral chopper systems, to utilize interruption plates whose heights fall within a range from about 1 mm. to 25 mm. If desired, multiple interruption plates can be employed.

As has been noted hereinabove, it has also typically been the case in the past that the concave pan portion of the chopper grate assembly was so constructed, as by the welding of various components together, to be a major component of the integral chopper systems along and past which the residue would flow as it passed between the rotary element and the chopper grate assembly. It has been found that, frequently, the wear along the concave pan portion has been non-uniform, with the grate portion experiencing the greatest wear, and with the concave pan portion therefore requiring replacement as a large component whenever the wear on the grate portion became undesirable. Such replacement of the concave pan portion, because of the size of such major component, has been cumbersome and more difficult than might otherwise have been desirable, especially when the remainder of the concave pan portion, other than the grate portion, remained generally serviceable.

Figure 20:
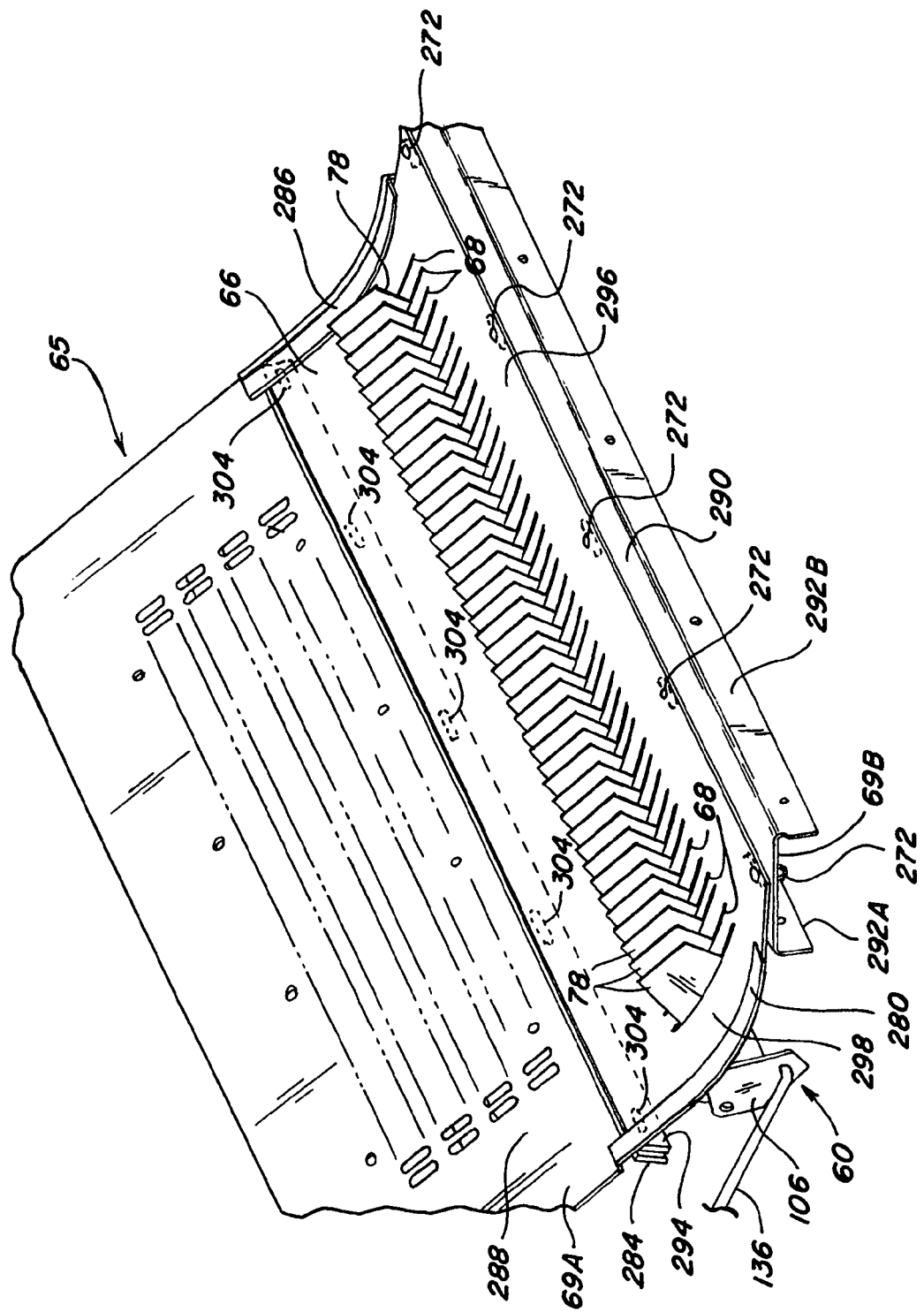
FIG. 20 is a perspective view of a portion of the chopper grate assembly better illustrating the side-to-side adjustability of the grate portion thereof.
Figure 21:
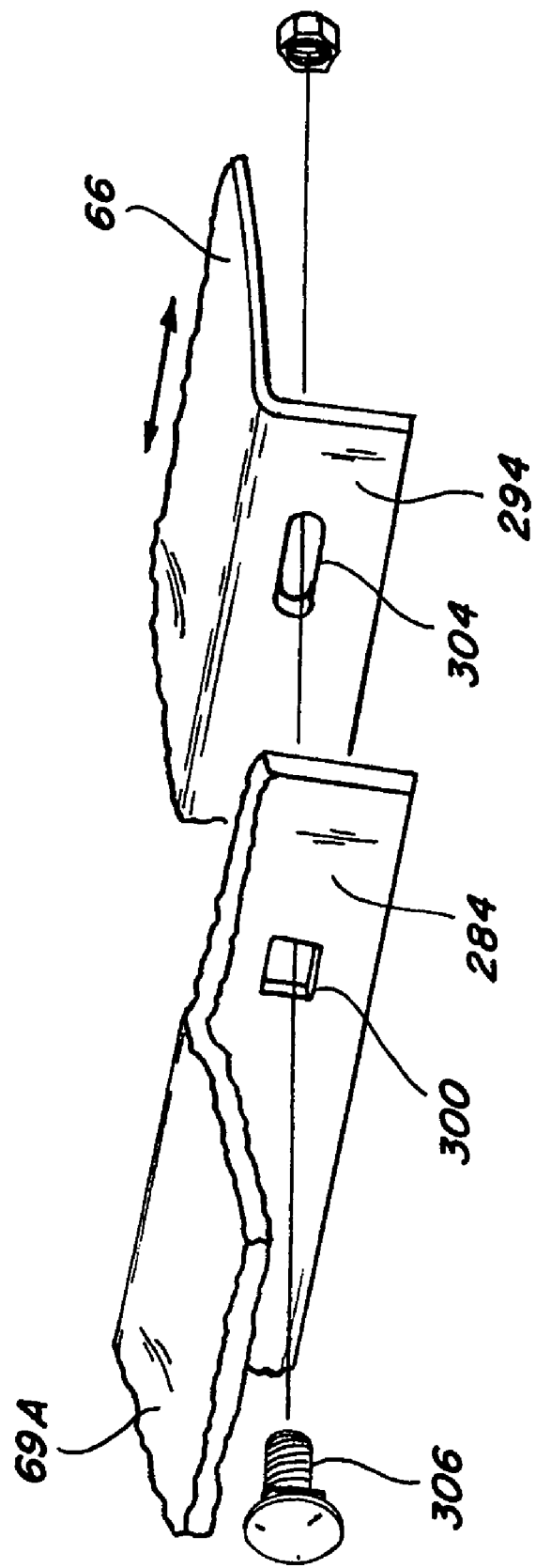
FIG. 21 is an enlarged perspective view of a portion of the chopper grate assembly of FIG. 20 better illustrating connection features between certain elements thereof.

As may be observed from FIG. 5, in the present preferred construction of integral chopper assembly 46, grate portion 66 is provided as a separate element that can be easily mated, as better depicted in FIGS. 20-21, with leading and trailing plate portions 69A and 69B of concave pan portion 65, as a consequence of which grate portion 66 can be easily removed if and when it becomes undesirably worn and replaced with a like element. As may be further observed from FIG. 5, concave pan portion 65 includes a shell portion 280 that includes the leading and trailing plate portions 69A and 69B installed between opposed concave pan side walls or plates 84 and 86, with an intermediate opening 282 between the leading and trailing plate portions 69A and 69B, into which intermediate opening 282 grate portion 66 may be inserted and installed.

As better shown in FIG. 20, in which the concave pan side plates 84 and 86 are not shown for purposes of clarity, leading plate portion 69A has a depending flange 284 along its trailing side, with guide runners 286 extending rearwardly from adjacent the upper surface 288 of such leading plate portion 69A along the concave pan side plates 84 and 86 (shown in FIG. 5) towards the trailing plate portion 69B, which is shown in FIG. 20 as having a channel shape with an upper web portion 290 extending between leading and trailing side portions 292A and 292B thereof.

Grate portion 66 is sized to fit between concave pan side plates or walls 84 and 86, with a depending flange 294 at its leading side and an extending flap overlay 296 at its trailing side. Flap overlay 296 is insertable from below the concave pan shell portion 280 (better shown in FIG. 5) to position flap overlay 296 in an overlapping engagement (as shown in FIG. 20) with the web portion 290 of trailing plate portion 69B and to position the leading depending flange 294 of grate portion 66 in matable engagement with the depending flange 284 of leading plate portion 69A, with the upper surface 298 of grate portion 66 adjacent to the bottom sides of guide runners 286. The grate portion 66 may be connected to the leading and trailing plate portions 69A and 69B by any suitable connection constructions.

Preferably, however, the grate portion 66 will be so sized to permit some side-to-side, or crossways, adjustability thereof within the intermediate opening 282 between the leading and trailing plate portions 69A and 69B of the concave pan portion 65, and the connection constructions associated therewith will have sufficient play therewith or therein to permit such adjustability. In the preferred embodiment depicted in FIGS. 20-21, the depending flanges 284 and 294 on the leading plate portion 69A and the grate portion 66 have holes 300 and/or slots 304 therein which are generally registrable with one another and with which nut and bolt connections 306 can be utilized to connect such depending flanges to one another. Similarly, flap overlay 296 of grate portion 66 and web portion 290 of trailing plate portion 69B may have holes and/or slots therein which are generally registrable with one another and with which nut and bolt connections can be utilized to connect such flap overlay to such web portion. By slightly oversizing some or all of such holes or slots relative to the bolts that may be inserted therethrough, the desired degree of side-to-side adjustability of the grate portion 66 can be provided.

Such adjustability allows users to greatly minimize problems associated with the proper installation and alignment of the rotary assembly with the chopper grate assembly. In the past, rotary chopper elements were typically installed first, followed by installation of the chopper grate assemblies. With the grate portions of such chopper grate assemblies welded in place as part of the concave pan portion, difficulties could ensue not only in aligning the knife elements of the counter knife assemblies with the slots of the grate portions, but also, once such alignment had been accomplished, in ensuring the interengagement of the knife blades of the rotary member with the projecting knife elements of the counter knife assembly so that the knife blades could rotate past the knife elements without coming in contact therewith. Frequently, such alignment activities would, once alignment of the knife elements with the slots had been accomplished, entail side-to-side jockeying of the already previously positioned rotary chopper element to effect a non-contacting interengagement between the knife blades and the knife elements. Such alignment activities were both time consuming and frustrating to users.

Due to the relatively easy replaceability of the grate portion 66 in the concave pan shell portion 280 of the present construction and the side-to-side adjustability of such grate portion 66, alignment activities have been greatly simplified. Once the knife elements 78 are installed on the retainment mounts 232, such knife elements can be relatively easily aligned with the slots in grate portion 66 by sliding the trough bracket 230 along shaft member 112. With the knife element 78 projecting through slots 68 of grate portion 66, the grate portion 66 may be adjusted side-to-side between concave pan side plates 84 and 86 to align knife elements 78 with knife blades 62 to avoid contact therebetween, all without requiring any repositioning or jockeying of the rotary chopper element 47. If the adjustment mechanism 101 of the counter knife assembly 60 is so designed that it will allow the retraction of knife elements 78 within slots 68 so that the tops of such knife elements 78 are approximately flush with the upper surface of the grate portion, but not totally withdrawn from such slots 68, such knife elements 78 will generally remain in alignment with and be self aligning with such slots 68 due to the ability of the trough bracket 230 to slide along shaft member 112.

Figure 22:
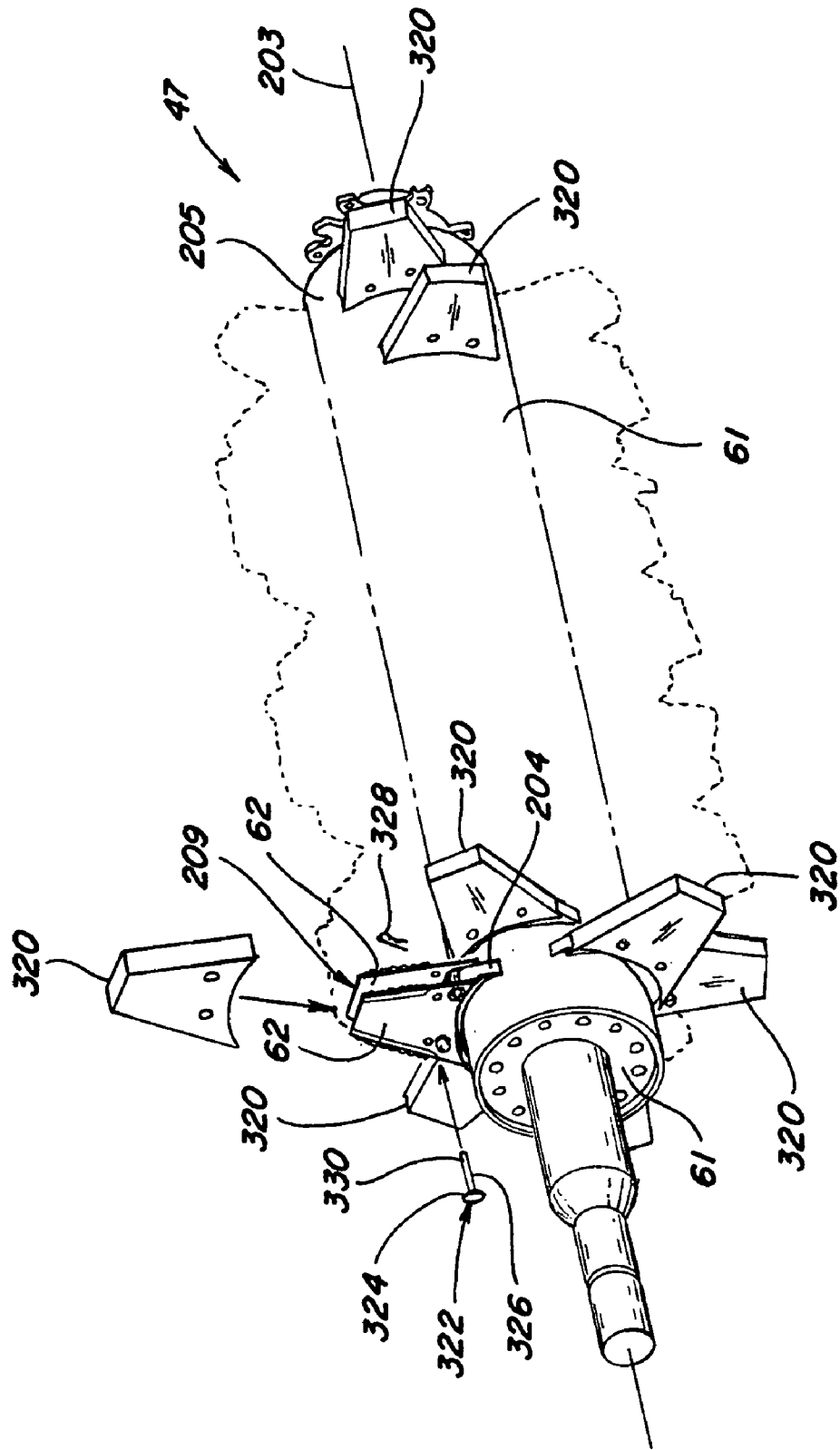
FIG. 22 is a perspective view of a rotary chopper element such as the rotary chopper element in FIG. 2, but wherein the mounted assemblies thereon are covered by optional blade covers mounted over the mounted assemblies to convert the integral chopper assembly to function as a beater construction.

Optionally, as shown in FIG. 22, blade covers 320 may be provided to be mounted over the mounted assemblies 209 that are disposed on the rotary member 61 so as to convert the integral chopper assembly 46 to function as a beater, as opposed to chopping, construction. Such conversion may be considered desirable in circumstances when users wish to pass the crop residue rearwardly with less damage thereto for windrowing. The covers 320, which may be formed of any suitable material, may be configured to fit over and encompass therewithin the mounted assemblies 209 and the knife blades 62 thereof (FIGS. 6-11), and may be securable in place by suitable connector constructions, such as by a clevis pin combination 322 that includes a clevis pin 324, whose shank 326 passes through registered holes in a cover 320 and a mounted assembly 209, in association with a cotter-type pin 328 that is inserted through a locking hole 330 in the clevis pin shank 326 to secure the clevis pin 324 in place.

With such a connector construction, which is but one of many connector constructions that could be employed, the covers 320 may be relatively quickly installed and removed, as desired by a user, without the need for or use of other tools. The blade covers may be configured to be complementarily engagable with the particular arrangements of knife blades mounted on the rotary member and may, for example, be formed to fit over multiple mountings when knife blade arrangements so permit, such as if and when the mounted assemblies on the rotary member 61 are distributed or arranged generally in rows along the rotary member 61. Such blade covers permit a rotary member 61 with a plurality of knife blades 62 thereon to, effectively, be converted to a rotary member that has a multitude of more blunt beater members thereon.

Such a conversion from chopping to beating for windrowing is further enhanced as the speed of the rotary member is changed from its one operating speed of around 3000 RPM to its alternate operating speed of around 800 RPM. Such change in speed results in changed characteristics for the moments of inertia of the mounted elements about the rotary member 61, which changes are more pronounced when the mounted assemblies are converted to present more blunt beater members in place of the dual knife blades.

Although the foregoing discussions have been presented with particular reference to integral chopper assemblies, it should be understood and appreciated that the present invention is not intended to be and should not be considered to be limited to use or practice in or with integral chopper systems. It should be recognized that the present invention may well also find application and be advantageously employed and practiced in various other types of chopper systems, including, by way of example only and not of limitation, hood mount chopper systems. Accordingly references in the claims which follow to chopper assemblies or chopper systems are intended to be broadly treated and not limited to integral chopper assemblies or systems.

In light of all the foregoing, it should thus be apparent to those skilled in the art that there has been shown and described an improved integral chopper assembly that includes various features and components, including in the knife bank assembly described hereinabove, that function to provide the advantages sought therefor. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the integral chopper assembly and of the invention that forms a part thereof, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A chopper assembly of a combine comprising a counter knife assembly including a grate portion extending between concave pan side walls and having slots therethrough through which knife elements of an underlying knife bank assembly may project to chop crop residue passing thereby through the chopper assembly, the counter knife assembly further including a shaft member that extends between journalled mountings at the concave pan side walls to which a knife bank is mounted, said knife bank assembly further comprising an elongated bracket member extending generally beneath the grate portion,
a plurality of knife elements operatively connected to said bracket member at spaced locations therealong, the spacings between knife elements corresponding to spacings between slots of the grate portion,
said knife elements dimensioned to be insertable to extend through the slots in the grate portion,
said elongated bracket member having a mounting portion along a side thereof through which the shaft member of the counter knife assembly can pass and along which the bracket member may slide side-to-side when mounted thereto,
said bracket member slidable by a user along the shaft member to align said knife elements with the slots in the grate portion, wherein said bracket member includes a plurality of retainment mounts secured to said bracket member at spaced locations therealong, each retainment mount having at least one knife element removably mounted thereto, wherein said knife elements that are removably mounted to said at least one retainment mount each have a base portion with two spaced mounting holes across the width of said base portion,
said at least one retainment mount includes generally flat sides with a mounting hole extending between said generally flat sides generally transverse to said flat sides and a mounting slot extending between said generally flat sides generally transverse to said flat sides, the distance between said mounting hole and said mounting slot corresponding to the distance between said two said two spaced mounting holes of said base portion of said knife elements,
said knife bank assembly includes a first connection construction extending through said mounting hole and one of said mounting holes in said base portion of each of said knife elements removably mounted to such retainment mount to define a pivot axis for such knife elements,
said knife bank assembly includes a second connection construction extending through said mounting slot and the other of said mounting holes in said base portion of each of such knife elements to exert a clamping force to clamp such knife elements in an extended position,
each of such knife elements having a first edge defined as the leading edge thereof upstream of said mounting hole and a second edge defined as the trailing edge downstream of said mounting slot,
whereby application of a force to said leading edge of one of such knife elements sufficient to overcome said clamping force will effect rotation of the knife element to which such force is applied about said pivot axis to a displaced position.

2. The knife bank assembly of claim 1 wherein at least one of said retainment mounts includes two knife elements removably mounted thereto in a spaced side by side arrangement, the spacing between said two knife elements removably mounted thereto corresponding to a spacing between slots of the grate portion.

3. The knife bank assembly of claim 2 wherein said at least one retainment mount includes a central portion between two spaced side walls, said central portion having a width approximately equal to said spacing between slots of the grate portion.

4. The knife bank assembly of claim 3 wherein said central portion of said at least one retainment mount is a body portion.

5. The knife bank assembly of claim 3 wherein said central portion of said at least one retainment mount is a web portion.

6. The knife bank assembly of claim 3 wherein said central portion is removably connected to said bracket member.

7. The knife bank assembly of claim 6 wherein said retainment mounts are all of generally like construction and are removably connected to said bracket member.

* * * * *